United States Patent
Kaliski, Jr. et al.

[11] Patent Number: 5,854,759
[45] Date of Patent: Dec. 29, 1998

[54] METHODS AND APPARATUS FOR EFFICIENT FINITE FIELD BASIS CONVERSION

[75] Inventors: Burton S. Kaliski, Jr., Wellesley, Mass.; Yiqun Lisa Yin, San Mateo, Calif.

[73] Assignee: RSA Data Security, Inc., Redwood City, Calif.

[21] Appl. No.: 851,045

[22] Filed: May 5, 1997

[51] Int. Cl.$^6$ ........................................ G06F 7/72
[52] U.S. Cl. ........................................ 364/746.1
[58] Field of Search .................. 364/746.1, 746

[56] References Cited

U.S. PATENT DOCUMENTS

| | | | |
|---|---|---|---|
| 4,745,568 | 5/1988 | Onyszchuk et al. | 364/746.1 |
| 4,994,995 | 2/1991 | Anderson et al. | 364/746.1 |
| 5,227,992 | 7/1993 | Lee et al. | 364/746.1 |
| 5,555,516 | 9/1996 | Zook | 364/746.1 |

*Primary Examiner*—David H. Malzahn
*Attorney, Agent, or Firm*—Testa, Hurwitz & Thibeault, LLP

[57] ABSTRACT

Methods and apparatus for converting a value A representing in a first basis an element of a finite field $GF(q^m)$ to a value B representing the element in a second basis, where q is a prime number or power of a prime number and m is an integer greater than or equal to 2, and where the value B includes a vector of m coefficients from a finite field $GF(q)$. An exemplary apparatus, particularly well-suited for exporting the value A in an internal basis representation to the value B in an external basis representation, includes an externally shifted sequence generator for generating from the value A a sequence of intermediate values representing in the first basis elements of the finite field $GF(q^m)$ whose representations in the second basis are related to the value B by a predetermined external shift operation. An extractor coupled to the externally shifted sequence generator receives and processes the sequence of intermediate values to generate each coefficient of the value B.

34 Claims, 10 Drawing Sheets

METHODS AND APPARATUS FOR EFFICIENT FINITE FIELD BASIS CONVERSION

FIELD OF THE INVENTION

The present invention relates generally to techniques for converting signals of a finite field having one basis to signals of a finite field having another basis, and more particularly to finite field basis conversion techniques which are suitable for use with a number of different types of bases.

BACKGROUND OF THE INVENTION

Finite field arithmetic is becoming increasingly important in today's computer systems, particularly for cryptographic operations. Among the more common finite fields in cryptography are odd-characteristic finite fields of degree 1, conventionally known as GF(p) arithmetic or arithmetic modulo a prime, and even-characteristic finite fields of degree greater than 1, conventionally known as $GF(2^m)$ arithmetic, where m is the degree. Arithmetic in $GF(2^m)$, or any finite field of degree greater than 1, can be further classified according to the choice of basis for representing elements of the finite field. Two common choices are polynomial basis and normal basis. For a variety of reasons, including cost, performance, and compatibility with other applications, implementations of $GF(2^m)$ arithmetic vary in their choice of basis. The variation in choice affects interoperability, since field elements represented in one basis cannot be operated on directly in another basis. The problem of interoperability limits the applicability of implementations to cryptographic communication. As an example, if two parties wish to communicate with cryptographic operations and each implements finite field arithmetic in a different basis, then at least one party must do some conversions, typically before or after communicating a field element, or at certain points in the cryptographic operations. Otherwise, the results of the cryptographic operations will be different.

Elements of a finite field can be represented in a variety of ways, depending on the choice of basis for the representation. Let $GF(q^m)$ be the finite field, and let $GF(q)$ be the ground field over which it is defined, where q is a prime or a prime power. The characteristic of the field is p where $q=p^r$ for some prime p and some $r \geq 1$. For even-characteristic fields, p=2. The degree of the field is m; its order is $q^m$. A basis for the finite field is a set of m elements $\omega_0, \ldots, \omega_{m-1} \in GF(q^m)$ such that every element $\epsilon$ of the finite field can be represented uniquely as a linear combination of basis elements:

$$\epsilon = \sum_{i=0}^{m-1} B[i]\omega_i$$

where $B[0], \ldots, B[m-1] \in GF(q)$ are the coefficients.

Addition in the basis is by coefficient. Let $B[0], \ldots, B[m-1]$ and $C[0], \ldots, C[m-1]$ be the representations of two elements to be added. The representation of their sum is $D[0], \ldots, D[m-1]$ where for all i, $D[i]=B[i]+C[i]$ over $GF(q)$. In the case q=2, the addition is simply an XOR operation. Subtraction can be defined in a similar manner.

Multiplication in the basis can be done by applying multiplication matrices, although for some bases multiplication can be done in a more direct manner. For any basis, a set of multiplication matrices can be defined. Let $K_k$ be the matrix whose [i,j]th element, $0 \leq i,j < m$, is the coefficient at index k of the representation in the basis $\omega_0, \ldots, \omega_{m-1}$ of the product $\omega_i \omega_j$. Then $$\omega_i \omega_j = \sum_{k=0}^{m-1} K_k[i,j]\omega_k.$$

Each multiplication matrix is invertible. Let $B[0], \ldots, B[m-1]$ and $C[0], \ldots, C[m-1]$ be the representations of two elements. The representation of their product is $D[0], \ldots, D[m-1]$ where a coefficient $D[k]$ is defined by the matrix-vector product $$D[k]=BK_k C^T,$$

viewing B and C as row vectors of dimension m. Division is defined as multiplication of an inverse over the field, where the inverse may be computed using a variety of techniques.

As noted above, two common types of basis are polynomial basis and normal basis. In a polynomial basis, the basis elements are successive powers of an element $\gamma$, called the generator:

$$\omega_i = \gamma^i.$$

The element $\gamma$ must satisfy certain properties, namely that the powers $\gamma^0, \ldots, \gamma^{m-1}$ are linearly independent. A polynomial $f$ of degree m, called the minimal polynomial of $\gamma$, relates the successive powers, so that $$\gamma^m = f_{m-1}\gamma^{m-1} + f_{m-2}\gamma^{m-2} + \ldots + f_1\gamma + f_0.$$

Such a polynomial $f$ must be irreducible over the ground field $GF(q)$. A field element is thus expressed as a polynomial in the generator, modulo the minimal polynomial. In other words, an element $\epsilon$ is represented in a polynomial basis as:

$$\epsilon = \sum_{i=0}^{m-1} B[i]\gamma^i$$

where $\gamma$ is the generator. For purposes of illustration below, the coefficients will be assumed to be ordered according to decreasing powers of the element $\gamma$, as in:

$$(B[m-1], B[m-2], \ldots, B[1], B[0]).$$

However, this is simply a matter of convention, and the basis conversion techniques to be described herein are easily adapted to an ordering where the coefficient $B[0]$ is first, as well as to other orderings.

In a normal basis, the basis elements are successive exponentiations of an element $\gamma$, again called the generator:

$$\omega_i = \gamma^{q^i}.$$

In this case, the successive exponentiations must be linearly independent. A field element is expressed as a linear combination of the successive exponentiations. In other words, an element $\epsilon$ is represented in a normal basis as:

$$\epsilon = \sum_{i=0}^{m-1} B[i]\gamma^{q^i}$$

where $\gamma$ is the generator. For purposes of illustration below, the coefficients will be assumed to be ordered according to increasing powers of the element $\gamma$, as in:

$$(B[0], B[1], \ldots, B[m-2], B[m-1]).$$

As above, this is simply a matter of convention.

Another common type of basis is a scaled polynomial basis. Let $v$ be a nonzero element and let $\gamma$ be the generator of a polynomial basis. The basis elements are powers of the generator $\gamma$, scaled by the element $v$:

$$\omega_i = v\gamma^i$$

For purposes of illustration below, the coefficients of a scaled polynomial-basis representation will be assumed to be ordered according to decreasing powers of the element $\gamma$, as is the case for an ordinary polynomial basis.

Another common type of basis is known as dual basis. Let $\omega_0, \ldots, \omega_{m-1}$ be a basis and let h be a linear function from $GF(q^m)$ to $GF(q)$, i.e., a function such that for all $\in$ and $\phi$, $$h(\in + \phi) = h(\in) + h(\phi).$$

The dual basis of the basis $\omega_0, \ldots, \omega_{m-1}$ with respect to h is the basis $\xi_0, \ldots, \xi_{m-1}$ such that for all i,j, $$h(\omega_i \xi_j) = \begin{cases} 1 \text{ if } i = j; \\ 0 \text{ otherwise}. \end{cases}$$

The dual basis is uniquely defined, and duality is symmetric in that the dual basis with respect to h of the basis $\xi_0, \ldots, \xi_{m-1}$ is the basis $\omega_0, \ldots, \omega_{m-1}$. A dual basis can be defined for a polynomial basis, a normal basis, or any other choice of basis, and with respect to a variety of functions including, as an example, a function that evaluates to a particular coefficient of the representation of the field element in some basis.

Additional details regarding finite field techniques may be found in, for example, R. Lidl and H. Niederreiter, "Finite Fields," volume 20 of Encyclopedia of Mathematics and Its Applications, Addison-Wesley, 1983; I. E. Shparlinski, "Computational and Algorithmic Problems in Finite Fields," Mathematics and Its Applications (Soviet Series), Kluwer Academic Publishers, 1992; A. Menezes, I. Blake, X. Gao, R. Mullin, S. Vanstone, and T. Yaghoobian, "Applications of Finite Fields," Kluwer Academic Publishers, 1993; and A. Menezes, P. van Oorschot, and S. A. Vanstone, Handbook of Applied Cryptography, Ch. 2, CRC Press, 1996; all of which are incorporated by reference herein.

It is well known that it is possible to convert between two choices of basis for a finite field. A conventional approach to such basis conversion involves the use of matrix multiplication. The basis conversion or change-of-basis problem may be stated as computing the representation of an element of a finite field in one basis, given its representation in another basis. The general solution to the problem is to apply the change-of-basis matrix relating the two bases. Suppose that one is converting from the representation $$\epsilon = \sum_{i=0}^{m-1} B[i]\omega_i$$

to another basis. Let $W_i$ be the representation in the second basis of the element $\omega_i$, and let M, the change-of-basis matrix, be an m×m matrix with columns $W_0, \ldots, W_{m-1}$. It follows that the representation A of the element $\in$ in the second basis can be computed as the matrix-vector product $$A^T = MB^T$$

where A and B are row vectors of dimension m. A change-of-basis matrix is invertible, and a conversion in the reverse direction can therefore be performed by computing $$B^T = M^{-1}A^T.$$

The change-of-basis-matrix solution is straightforward and effective, but suffers from a number of fundamental problems. A particularly significant problem is that the matrix M is unduly large in many applications. For example, a change-of-basis matrix for $GF(2^m)$ arithmetic will generally have $m^2$ entries, requiring several thousand bytes or more of storage in typical applications (e.g., $m \approx 160$). While such a matrix may be reasonable to store in a software implementation, it is likely to be a significant burden in a low-cost hardware implementation. Moreover, in order to provide conversion in both directions, it may be necessary to store or to compute the inverse matrix $M^{-1}$ as well, thereby further limiting the storage and computational efficiency of the matrix multiplication approach. Furthermore, the operations involved in computing the matrix-vector product, while generally involving coefficients in the ground field, are not necessarily implementable with operations in either basis. Thus, the conversion process may not be as efficient as desired.

Another approach to basis conversion utilizes the above-described dual basis. Consider the problem of converting to the basis $\omega_0, \ldots, \omega_{m-1}$, and let $\xi_0, \ldots, \xi_{m-1}$ be its dual basis with respect to some linear function h. Then by the definition of the dual basis and the linearity of h, it follows that for all i, $$B[i] = h(\epsilon \xi_i).$$

A conversion can therefore be performed by multiplying by elements of the dual basis and evaluating the function h. But this approach is again limited by a number of difficulties. First, the approach requires the elements of the dual basis $\xi_0, \ldots, \xi_{m-1}$, which must either be stored in the form of $m^2$ coefficients, or computed. Second, it requires the computation of the function h, which may or may not be efficient. As an example, a typical function h is the trace function $$Tr(\epsilon) = \epsilon + \epsilon^q + \epsilon^{q^2} + \ldots + \epsilon^{q^{m-1}}$$

Clearly, the trace function can be inefficient to compute directly in some choices of basis. More practical choices of h have been suggested, such as a particular coefficient of the representation in some basis. See, for example, S. T. J. Fenn, M. Benaissa, and D. Taylor, "Finite Field Inversion Over the Dual Basis," IEEE Transactions on VLSI, 4(1):134–137, March 1996, which is incorporated by reference herein. But even with a more practical h, there still remains the problem of determining the dual basis efficiently.

A number of references describe finite field basis conversion or other finite field operations. For example, implementation of normal-basis arithmetic is described in U.S. Pat. No. 4,587,627, issued May 6, 1986 to James L. Massey and Jimmy K. Omura and entitled "Computational Method and Apparatus for Finite Field Arithmetic," and U.S. Pat. No. 4,745,568, issued May 17, 1988 to I. M. Onyszchuk, R. C. Mullin, and S. A. Vanstone and entitled "Computational Method and Apparatus for Finite Field Multiplication," both of which are incorporated by reference herein. U.S. Pat. No. 5,227,922, issued Jul. 13, 1993 to M. Lee, J. Kim, H. Park, H. An, and H. Yeom, entitled "Operational Method and Apparatus over $GF(2^m)$ using a Subfield $GF(2^{m/2})$ describes hardware in which $GF(2^m)$ is considered to be a vector space over a subfield $GF(2^{m/2})$. The operations are performed over the subfield, which provides a speed-up in hardware processing. However, no general basis conversion algorithm is suggested. U.S. Pat. No. 4,994,995, issued Feb. 19, 1991 to R. W. Anderson, R. L. Gee, T. L. Nguyen, and M. A. Hassner, entitled "Bit-Serial Division Method and Apparatus," describes hardware for a converter which converts an element in GF($2^m$) in a polynomial-basis representation to a scalar multiple of its dual basis representation, where the scalar is an element of the field. The scalar is chosen so that the scalar multiple of the dual has many of the same elements as the polynomial basis. The hardware consists of AND gates, XOR gates, and a table for computing the trace function. Again, no general conversion algorithm is suggested. U.S. Pat. No. 5,555,516, issued Sep. 10, 1996 to C. P. Zook, entitled "Multipurpose Error Correction Calculation Circuit," describes hardware for converting elements from one basis to another which simply stores the change-of-basis matrix and multiplies.

Other references describing finite field operations include the above-cited S. T. J. Fenn et al. reference, which describes conversion between a polynomial basis and its dual basis. However, the method is efficient only when m is very small, and no general efficient conversion algorithm is suggested. I. S. Hsu, T. K. Truong, L. J. Deutsch, and I. S. Reed, "A Comparison of VLSI Architecture of Finite Field Multipliers using Dual, Normal, or Standard Bases," IEEE Transactions on Computers, 37(6):735–739, June 1988, discloses conventional techniques for converting between polynomial and dual bases. D. R. Stinson, "On Bit-Serial Multiplication and Dual Bases in GF($2^m$)," IEEE Transactions on Information Theory, 37(6):1733–1737, November 1991, describes change-of-basis matrices between polynomial and dual bases. Given a polynomial basis such that the change-of-basis matrix M from the dual basis to some scalar (c $\in$ GF($2^m$)) times the polynomial basis that has as few "1" entries as possible, efficient bit-serial multiplication is possible. Given the minimal polynomial of $\alpha$, a generator of the polynomial basis, the paper gives simple formula computing a scalar c and the weight of the matrix M. See also M. Wang and I. F. Blake, "Bit Serial Multiplication in Finite Fields," In SIAM J. Discr. Math., 3(1):140–148, 1990; and Berlekamp, "Bit-Serial Reed-Solomon Encoders," IEEE Trans. Info. Theory, 28:869–874, 1982. M. Willet, "Arithmetic in a Finite Field," Math. Comp., 35:1353–1359, October 1980, describes hardware for multiplication in a finite field. The hardware uses a change-of-basis matrix M from polynomial basis to normal basis to do field multiplication, but the conversion requires storage of the matrix $M^{-1}JM$ for a certain other matrix J. Although the above-cited references disclose numerous conventional techniques for converting between two bases using a change-of-basis matrix, or converting between a polynomial basis and its dual basis, these techniques are generally inefficient in terms of memory, and may also be inefficient in terms of computation time.

It is therefore an object of the present invention to overcome the difficulties of the conventional approaches noted above, in order to provide finite field basis conversion techniques which do not require excessive storage, and which take advantage of the built-in efficiency of finite field operations in one basis, rather than implementing new operations such as matrix multiplications.

SUMMARY OF THE INVENTION

The present invention provides basis conversion algorithms that require substantially less storage than conventional basis conversion approaches. The algorithms are also very efficient computationally in that they involve primarily or exclusively finite-field operations, rather than more complex operations such as matrix multiplications, and thus benefit from available optimizations for finite-field operations. The algorithms may be used to convert from a polynomial basis to a normal basis, from a normal basis to a polynomial basis, from a polynomial basis with one generator to a polynomial with another generator, or from a normal basis with one generator to a normal basis with another generator, to give a few examples.

The basis converters of the invention implement basis conversion algorithms involving a modest number of operations primarily or exclusively in one basis, and requiring minimal storage. The basis in which finite field operations are primarily performed is referred to herein as the internal basis, while the other basis is referred to as the external basis. A conversion operation from the external basis to the internal basis with thus be an import operation, and the reverse an export operation. The specific problems to be solved in the context of basis conversion therefore include an import problem and an export problem. The import problem may be characterized as follows: Given an internal basis and an external basis for a finite field GF($q^m$) and a representation B of a field element in the external basis (i.e., an external representation), determine the corresponding representation A of the same field element in the internal basis (i.e., an internal representation) primarily with internal-basis operations. The export problem may be characterized as follows: Given an internal basis and an external basis for a finite field GF($q^m$) and the internal representation A of a field element, determine the corresponding external representation B of the same field element primarily with internal-basis operations. The more general problem of converting from one basis to another with operations in a third basis is readily solved by importing to and re-exporting from the third basis. The basis conversion techniques described herein for converting to and from an internal basis can therefore be readily extended to cover the more general problem. The basis converters of the present invention are particularly well-suited for use in performing export operations, where operations are performed primarily in the internal basis.

Fundamental to the invention are two concepts: external shifting and coefficient extraction. External shifting refers generally to a process whereby the representation of an element in the internal basis is modified so that the corresponding external representation is shifted. In particular, let A be the internal representation of an element, and let B be the corresponding external representation. An external shifting operation on A computes an internal representation A' where the external representation B' corresponding to A' is a predetermined logical shift or rotation of B. As an example, suppose that the external basis is a polynomial basis, and that by convention the representation B has the form:

$(B[m-1], B[m-2], \ldots, B[1], B[0])$.

Then the representation B' could be a left shift of B:

$(B[m-2], B[m-3], \ldots, B[0], B0)$, a right shift of B:

$(0, B[m<1], \ldots, B[2], B[1])$, a left rotation of B:

$(B[m-2], B[m-3], \ldots, B[0], B[m-1])$, a right rotation of B:

$(B[0], B[m-1], \ldots, B[2], B[1])$, or some other shift or rotation of B, including a left or right shift where a value other than 0 is shifted in, or a shift or rotation by more than one position.

Similarly, supposing that the external basis is a normal basis and that by convention the representation B has the form:

$$(B[0], B[1], \ldots, B[m-2], B[m-1])$$

the representation B' could be a left shift of B:

$$(B[1], B[2], \ldots, B[m-1], 0),$$

a right shift of B:

$$(0, B[0], \ldots, B[m-3], B[m-2]),$$

a left rotation of B:

$$(B[1], B[2], \ldots, B[m-1], B[0]),$$

a right rotation of B:

$$(B[m-1], B[0], \ldots, B[m-3], B[m-2]),$$

or some other shift or rotation of B. As discussed below, right shifting is generally the preferred external shifting operation for an external polynomial basis and right rotation is generally preferred for an external normal basis, but other external shifting operations can be implemented. Moreover, the preferred operation will depend on the ordering of the coefficients, as noted above. External shifting in accordance with the invention is also intended to include external shifting which shifts subcoefficients in one or more coefficients.

An external shifter in accordance with the invention applies an external shifting operation to an internal representation as just described. An externally shifted sequence generator in accordance with the invention utilizes an external shifter to produce a sequence of internal representations related by external shifting operations.

Coefficient extraction is the process whereby one or more coefficients of the external representation of an element are computed from the internal representation of the element. In particular, a coefficient extraction operation on an internal representation A computes one or more coefficients $B[i_1]$, $B[i_2]$, ... of the corresponding external representation B, where $i_1, i_2 \ldots$ are predetermined indexes. An extractor in accordance with the invention computes one or more coefficients from an internal representation as just described.

The combination of external shifting and coefficient extraction in accordance with the invention is particularly effective in solving the export problem for basis conversion, since it is possible to obtain any subset of coefficients of the external representation of an element by extracting coefficients from values in an externally shifted sequence related to the element. As an illustration, suppose that the external basis is a polynomial basis, the coefficients are ordered according to decreasing powers of the generator, and the external shifting operation is a right shift operation. Then the externally shifted sequence will have the form:

$$(B[m-1], B[m-2], \ldots, B[1], B[0]),$$
$$(0, B[m-1], \ldots, B[2], B[1]),$$
.
.
.
$$(0, 0, \ldots, B[m-1], B[m-2]),$$
$$(0, 0, \ldots, 0, B[m-1]).$$

Any subset of coefficients can be obtained by extracting coefficients at one or more predetermined indexes from each value in the sequence. For instance, all m coefficients can be obtained by extracting the rightmost coefficient of each intermediate value, or by extracting a middle coefficient and the rightmost coefficient of the first half of the intermediate values.

An exemplary basis converter in accordance with the present invention converts a value A representing in a first basis an element of a finite field $GF(q^m)$ to a value B representing the element in a second basis, where q is a prime number or power of a prime number and m is an integer greater than or equal to 2, and where the value B includes a vector of m coefficients from a finite field $GF(q)$. The apparatus, which is particularly well-suited for exporting the value A in an internal basis representation to the value B in an external basis representation, includes an externally shifted sequence generator coupled to an extractor. The externally shifted sequence generator receives as an input the value A, and generates a sequence of intermediate values representing in the first basis elements of the finite field $GF(q^m)$ whose representations in the second basis are related to the value B by a predetermined external shift operation. In applications in which the second basis is a normal basis, the predetermined external shift operation may be a right rotation operation, while in applications in which the second basis is a polynomial basis, the predetermined external shift operation may be a right shift operation. An extractor is coupled to the externally shifted sequence generator and receives the sequence of intermediate values therefrom. The extractor processes the intermediate values to compute one or more coefficients of the value B.

The exemplary basis converter may further include a premultiplier for multiplying the value A by a scaling factor before the sequence of intermediate values are generated therefrom. The extractor may include a coefficient selector which receives the sequence of intermediate values and processes the intermediate values to generate the coefficients of the value B, and may include a multiplier for scaling the intermediate value sequence by an extraction factor before the scaled sequence is applied to the coefficient selector. The extractor may also apply an additional predetermined external shift operation to the sequence of intermediate values prior to computing the coefficients of the value B. The externally shifted sequence generator may include an exponentiator arranged in a feedback loop with an input register, such that the sequence of intermediate values is generated in the form of a sequence of successive exponentiations of the value A. Alternatively, the externally shifted sequence generator may include a scalar subtractor and multiplier, such that the intermediate value sequence is generated by performing the computation $A \leftarrow (A-tI)G^{-1}$, where t may be one of the coefficients of the value B, and $G^{-1}$ is an inverse of a generator G over $GF(q^m)$. As another alternative, the externally shifted sequence generator may include a scalar multiplier/subtractor and a multiplier, such that the intermediate value sequence is generated by performing the computation $A \leftarrow (A-tV)G^{-1}$, where V is a scaling factor applied as an input to the scalar multiplier/subtractor.

The basis conversion techniques of the present invention are particularly well-suited for use with even-characteristic finite fields, which are typical in cryptography and other important applications, but are also applicable to odd-characteristic finite fields. The variation in choice of basis for representing finite fields has affected interoperability, especially of cryptosystems. With the present invention, it is possible to extend an implementation in one basis so that it supports other choices of basis at only a small additional cost in terms of circuitry, program size, and storage requirements, thereby providing the desired interoperability and extending the set of parties that can communicate with cryptographic operations. These and other features of the present invention will become more apparent from the accompanying drawings and the following detailed description.

DETAILED DESCRIPTION OF THE INVENTION

The present invention will be described in several sections below in accordance with the following outline.

1.0 Implementations of a Rotate/Extract Basis Converter for Export Operations
2.0 Conversion Algorithms for Common Internal and External Ground Fields
   2.1 Importing from a Polynomial Basis
   2.2 Importing from a Normal Basis
   2.3 Exporting to a Polynomial Basis
   2.4 Exporting to a Normal Basis
3.0 Conversion Algorithms for Different Internal and External Ground Fields
   3.1 Importing from a Polynomial Basis with Polynomial Basis Coefficients
   3.2 Importing from a Polynomial Basis with Normal Basis Coefficients
   3.3 Importing from a Normal Basis with Polynomial Basis Coefficients
   3.4 Importing from a Normal Basis with Normal Basis Coefficients
   3.5 Exporting to a Polynomial Basis with Polynomial Basis Coefficients
   3.6 Exporting to a Polynomial Basis with Normal Basis Coefficients
   3.7 Exporting to a Normal Basis with Polynomial Basis Coefficients
   3.8 Exporting to a Normal Basis with Normal Basis Coefficients
4.0 Dual-Basis Conversions
   4.1 Exporting to a Dual Basis
   4.2 Importing from a Dual Basis of a Polynomial Basis
   4.3 Importing from a Dual Basis of a Normal Basis
5.0 Correspondence Between Figures and Conversion Algorithms
6.0 Applications
   6.1 Elliptic Curves over $GF(2^m)$ and Elliptic Curve Operations
   6.2 Elliptic Curve Cryptosystems
   6.3 Conversion between Polynomial and Normal Bases over $GF(2^m)$
   6.4 Cost of basis Conversion in Elliptic Curve Cryptosystems

Figure 1:
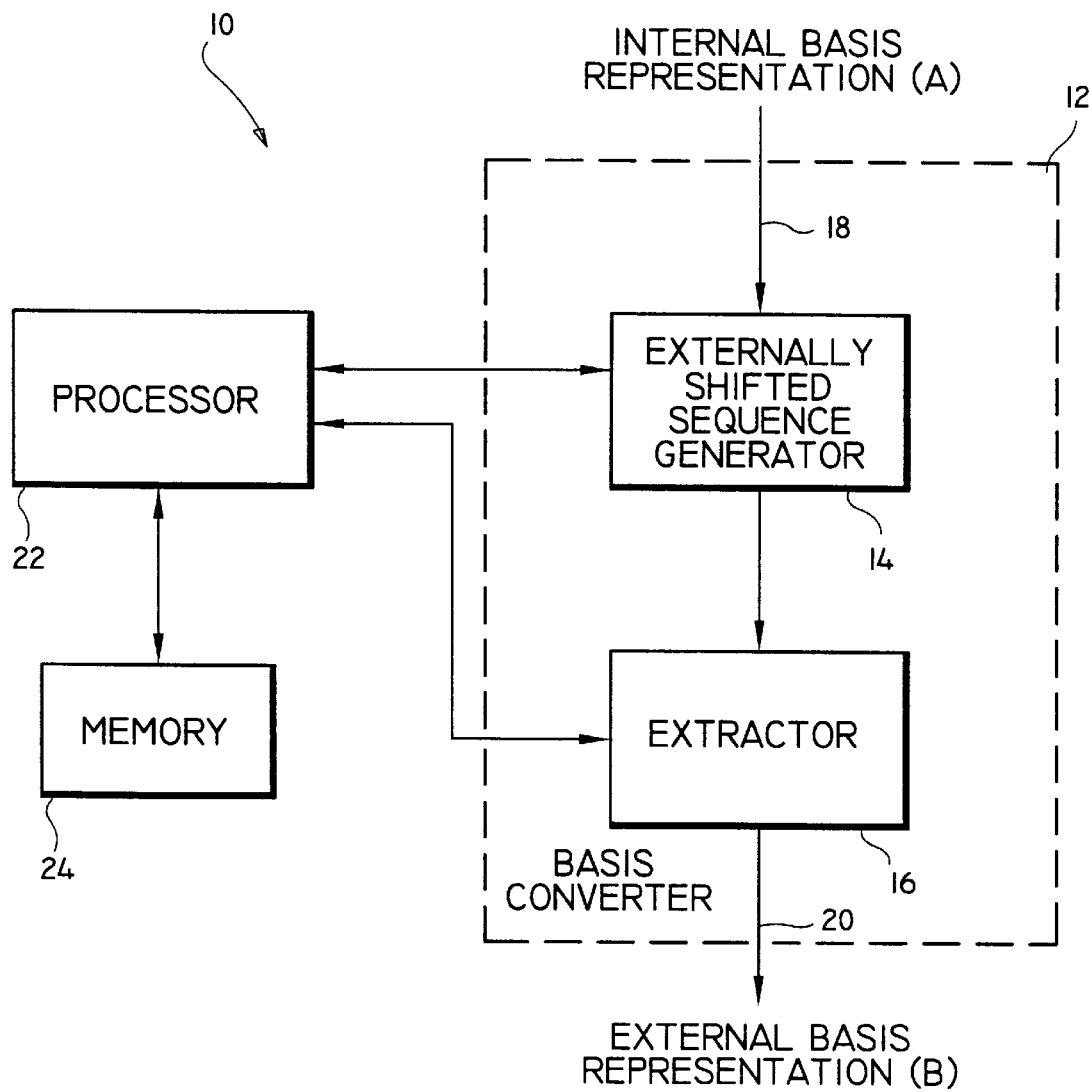
FIG. 1 is a block diagram of an illustrative embodiment of a processing system which includes a basis converter in accordance with the present invention.

1.0 Implementations of a Rotate/Extract Basis Converter for Export Operations FIG. 1 shows an exemplary system 10 in which certain basis conversion techniques in accordance with the present invention may be implemented. The system 10 includes a rotate/extract basis converter 12 comprising an externally shifted sequence generator 14 and an extractor 16. The basis converter 12 is configured to support an export operation, that is, the conversion of an internal basis representation A to an external basis representation B. The externally shifted sequence generator 14 receives an internal basis representation A via input 18. The externally shifted sequence generator 14 computes an internal basis representation of elements which, when input to the extractor 16, yield one or more coefficients of an external basis representation of input A. As will be described in more detail below, the externally shifted sequence generator 14 may be implemented as a circuit which rotates or shifts in the external basis rather than the internal basis. The extractor 16 uses the inputs received from the externally shifted sequence generator 14 to compute one or more coefficients of an external basis representation B which is provided at an output 20 of the basis converter 12. The processing system 10 further includes a processor 22 which operates in conjunction with a memory 24 to control the externally shifted sequence generator 14 and the extractor 16. The processing system 10 may be implemented in a personal desktop or portable computer, a microcomputer, a mainframe computer, a workstation, telephone, facsimile machine, television set top box or any other type of processing or communications terminal or device. The processor 22 may be a microprocessor, central processing unit (CPU), application-specific integrated circuit (ASIC) or any other suitable digital data processor. The basis converter 12 and the elements thereof may be configured as software modules executed by the processor 22, as separate dedicated hardware modules, or as various combinations of software and hardware. For example, both the externally shifted sequence generator 14 and extractor 16 may be embodied partially or completely in software executed by the processor 22. A tradeoff may be made in the implementation of the basis converter 12 between the number of coefficients computed by the extractor 16 for each input, and the number of external shift operations performed in the externally shifted sequence generator 14. In addition, the basis converter 12 may include more than one externally shifted sequence generator 14 and extractor 16. Also, depending on the implementation of the extractor, a tradeoff may be made between the number of coefficients output each time and the storage requirement (i.e., the number of extraction factors that need to be stored).

Figure 2A:
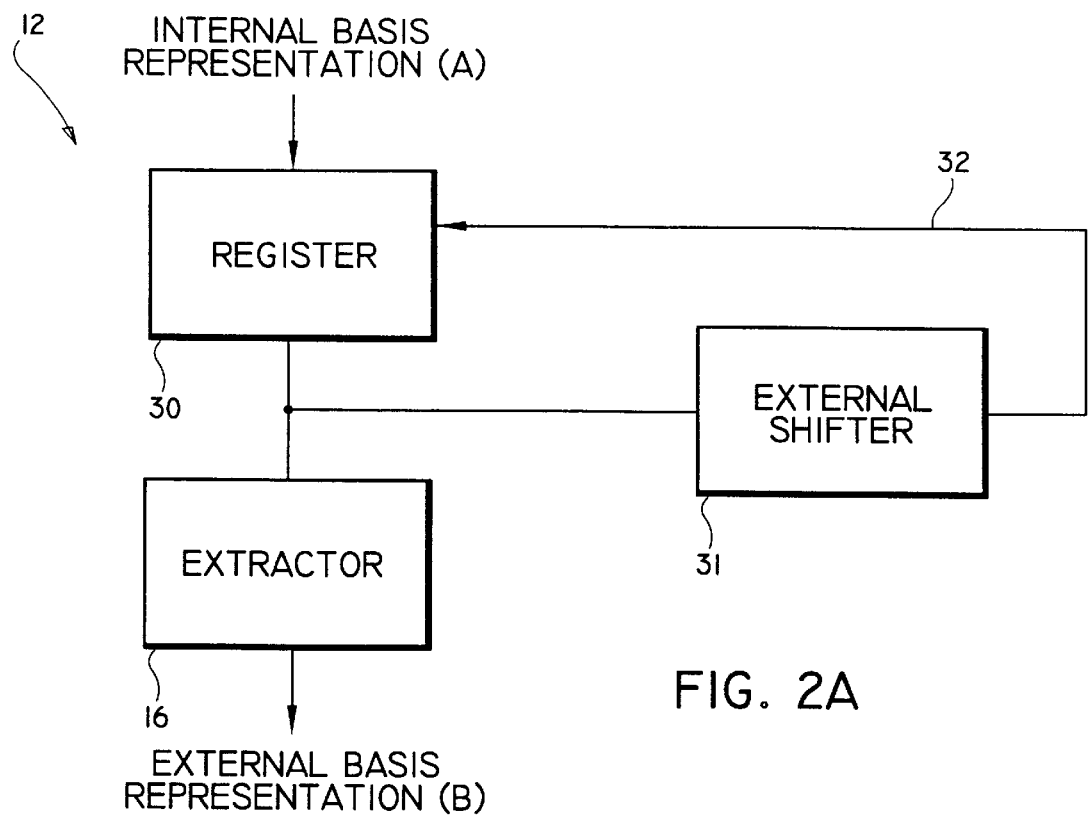
FIGS. 2A and 2B show more detailed block diagrams of exemplary implementations of the basis converter of FIG. 1.
Figure 2B:
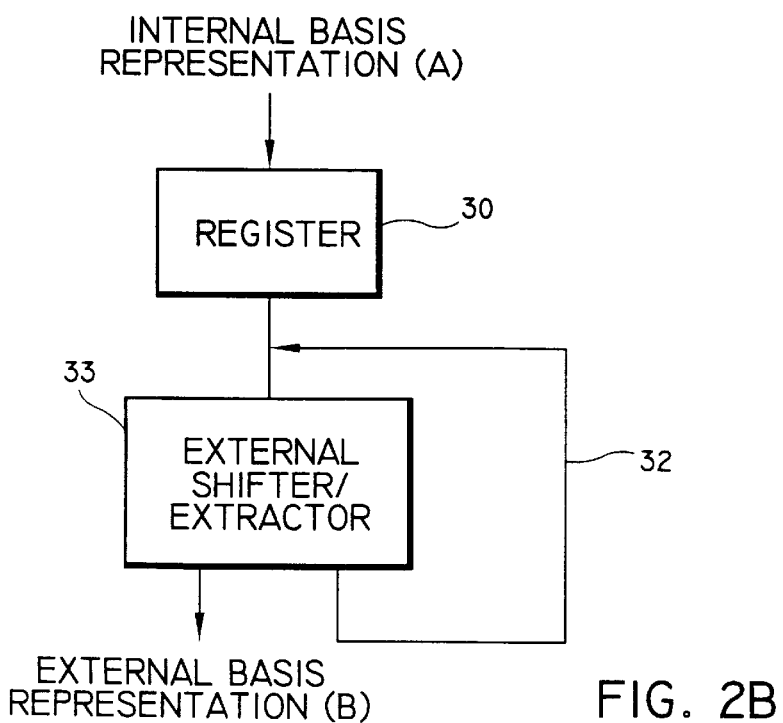

FIGS. 2A and 2B show more detailed block diagrams of the rotate/extract basis converter 12 of FIG. 1. In the FIG. 2A embodiment, the basis converter 12 includes the extractor 16 as previously described, while the externally shifted sequence generator 14 is implemented using a register 30 and an external shifter 31. The register 30 receives as an input the internal basis representation A. The register contents are applied to an input of the external shifter 31, which modifies the elements of the internal basis representation A one or more times, so that the corresponding external representation B is shifted one or more times. The modified elements are returned to the register 30 via the feedback loop 32. The external shifter 31 configures the contents of register 30 such that the sequence of modified elements, when input to the extractor 16, will yield coefficients of the external basis representation B. It should be noted that the basis converter 12 of FIG. 2A could include more than one external shifter in the feedback loop 32, or more than one feedback loop, to provide improved efficiency.

FIG. 2B shows an alternative embodiment of the basis converter 12 in which external shifter 31 and extractor 16 of FIG. 2A are combined into an external shifter/extractor 33. The external shifter/extractor 33 performs the operations of both the external shifter 31 and extractor 16 of FIG. 2A. The FIG. 2B embodiment, like that of FIG. 2A, generates a sequence of intermediate values which are related by external shift operations, feeds back the sequence via feedback loop 32 to the register 30, and extracts coefficients from the values in the sequence. The FIG. 2A embodiment is particularly well-suited for use with a normal basis, and the FIG. 2B embodiment for use with a polynomial basis, though either embodiment may be used with either basis. The external shifter/extractor 33 of FIG. 2B is substantially equivalent to a separate external shifter and extractor in terms of the sequence generated and the coefficients extracted, but these two elements may be combined as shown in FIG. 2B in order to minimize the amount of duplicated circuitry or for other implementation-specific reasons. Many of the exemplary basis conversion algorithms to be described in Sections 2, 3 and 4 below generally follow the FIG. 2B form, but each can also be viewed in the FIG. 2A form as having completely separate shifting and extraction operations. Subsequent descriptions relating to the external shifter or extractor alone should thus be understood to be applicable to a combined implementation such as that of FIG. 2B. It should also be noted that the embodiment of FIG. 5 below can be viewed as a special case of the FIG. 2B embodiment, where a coefficient required by the externally shifted sequence generator 14 is obtained from the extractor and computed once for both circuits instead of twice. The FIG. 2B embodiment may be viewed as including an externally shifted sequence generator which is made up of the register 30 and an external shifter portion of the external shifter/extractor 33.

Figure 3A:
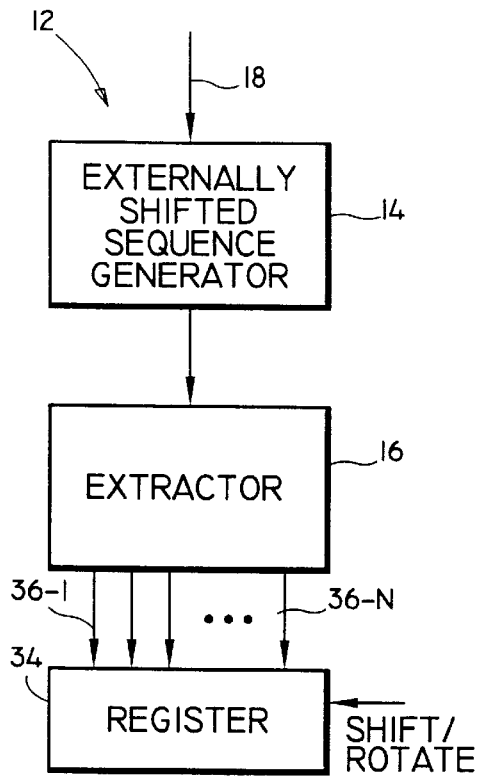
FIGS. 3A and 3B illustrate exemplary interconnections between an extractor and an output register in the basis converter of FIG. 1.
Figure 3B:
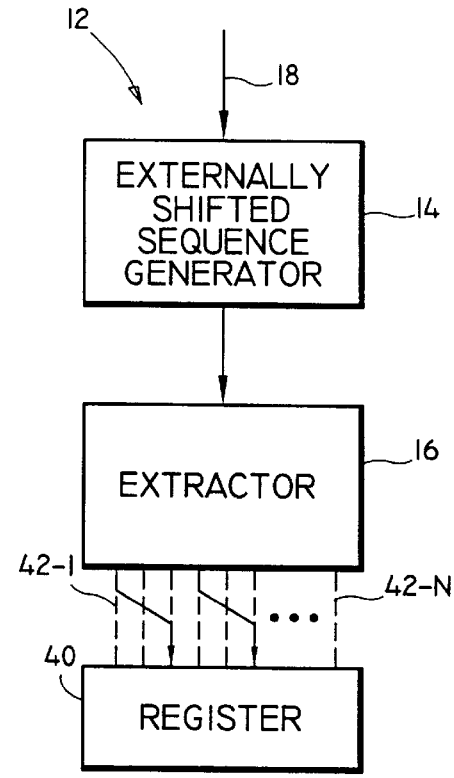

FIGS. 3A and 3B show alternative configurations of the rotate/extract basis converter 12, in which the output of extractor 16 is supplied to a register. FIG. 3A shows a configuration in which N outputs 36-i, i=1, 2, . . . N of the basis converter are directly connected to corresponding inputs a of a register 34. A shift/rotate input of the register 34 controls the storage positions of the contents of register 34 such that additional coefficients from the extractor 16 are received in the correct positions. The embodiment of FIG. 3A is thus a hardware-oriented embodiment, with direct connections between outputs of the extractor and inputs of the register 34, and register shift operations used to control storage position. In the FIG. 3B embodiment, the outputs 42-i, i=1, 2, . . . N of the extractor 16 are not directly connected to any particular input of a register 40. Instead, the extractor 16 stores the output coefficients in positions determined in accordance with a sequence of elements obtained from the externally shifted sequence generator 14. The FIG. 3B embodiment is therefore well-suited to a software implementation in which storage position of a given coefficient is computed prior to storage of that coefficient.

Figure 4:
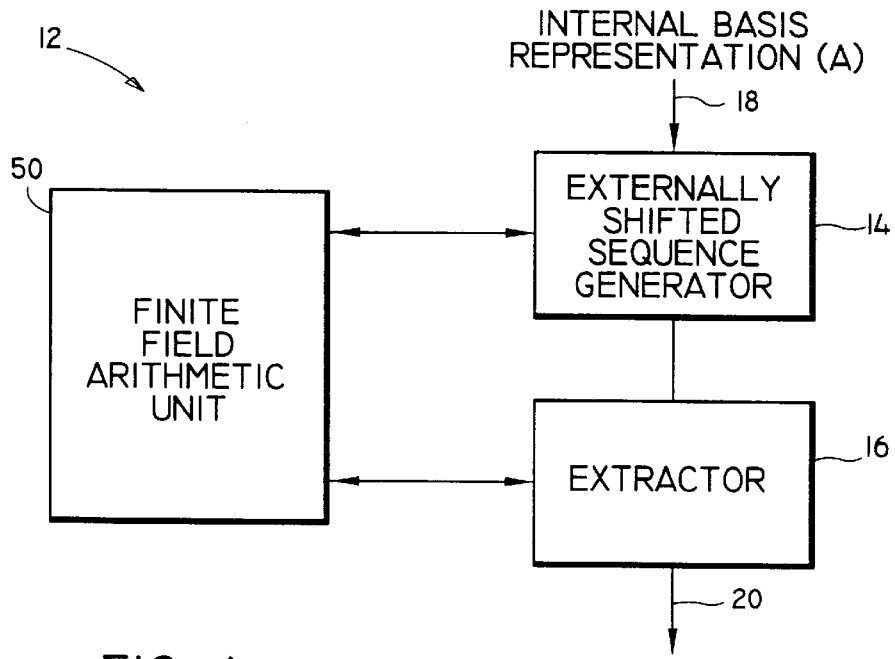
FIGS. 4, 5 and 6 show alternative implementations of a basis converter in accordance with the invention.
Figure 5:
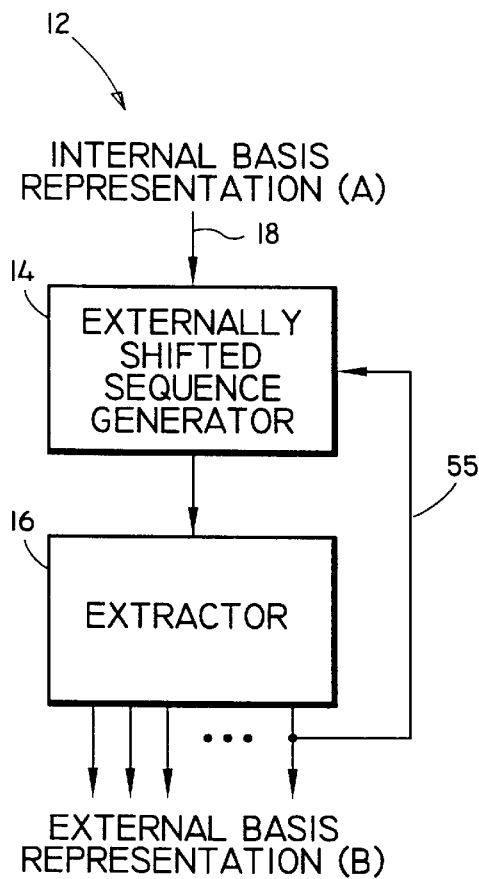
Figure 6:
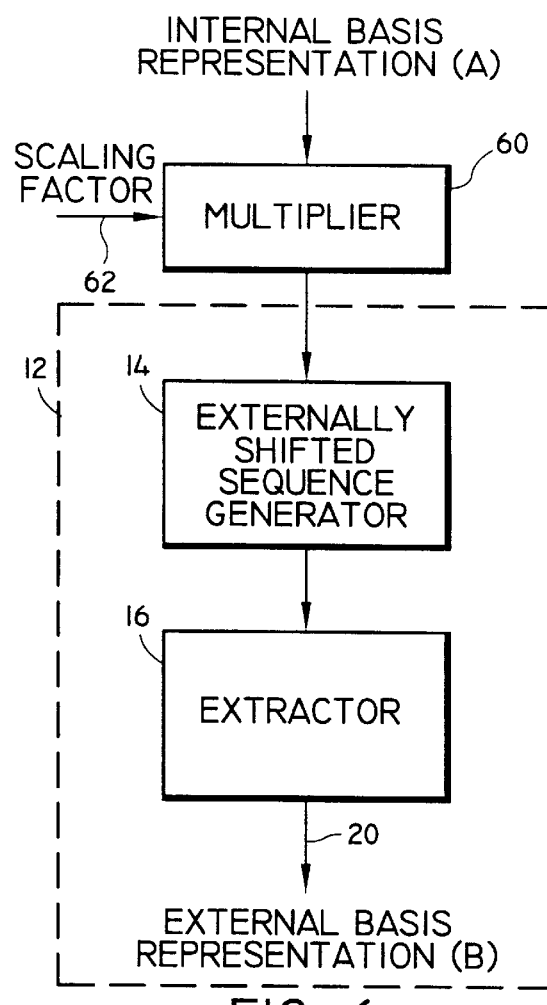

FIGS. 4, 5 and 6 show other alternative embodiments of the rotate/extract basis converter 12 of FIG. 1 in accordance with the present invention. FIG. 4 shows an embodiment in which the basis converter 12 includes a finite field arithmetic unit 50 in addition to the externally shifted sequence generator 14 and extractor 16 previously described. The finite field arithmetic unit 50 performs arithmetic operations as required by the externally shifted sequence generator 14 and extractor 16. Although shown as connected to both the externally shifted sequence generator 14 and the extractor 16, the arithmetic unit 50 may be connected to only one of these elements in alternative embodiments. The arithmetic unit may be implemented as part of the processor 22 of FIG. 1. The arithmetic unit may in addition provide standard arithmetic operations in the internal basis representation for general use.

FIG. 5 shows an embodiment of the rotate/extract basis converter 12 which includes a feedback path 55 between one of the outputs of the extractor 16 and a control input of the externally shifted sequence generator 14. The coefficient generated at the output of extractor 16 connected to feedback path 55 is supplied to the externally shifted sequence generator 14 as part of the external shift operation. Additional output coefficients may be fed back from the extractor 16 to the externally shifted sequence generator 14 in alternative embodiments. The embodiment of FIG. 5 and similar embodiments are particularly well-suited for use in implementing EXPORTPOLY and other conversion algorithms to be described in greater detail below.

FIG. 6 shows an embodiment of the rotate/extract basis converter 12 which utilizes premultiplication of the internal basis representation A by a scalar. The representation A is supplied to an input of a multiplier 60. The multiplier 60 receives an scaling factor on an input 62. The multiplier 60 scales the representation A in the internal basis. This scaling operation may be performed by an finite field arithmetic unit such as the arithmetic unit 50 of FIG. 4. The externally shifted sequence generator 14 and extractor 16 then convert to the scaled basis, rather than the original external basis, and therefore may be able to operate more efficiently than would otherwise be possible. The embodiment of FIG. 6 is also well-suited for use in implementing EXPORTPOLY and other conversion algorithms.

FIGS. 7A through 7E and FIGS. 8A through 8C show various illustrative embodiments of the extractor 16 in the rotate/extract basis converter 12. The FIG. 7A embodiment of extractor 16 includes an input register 70 having a number of storage locations 72-i, i=1, 2, . . . M. The outputs of the register 70 are applied to corresponding inputs of a coefficient selector 74. The coefficient selector 74 processes the elements stored in the input register to generate an output coefficient of the external basis representation B. The output coefficients are then stored in a register such as the register 34 of FIG. 3A or the register 40 of FIG. 3B.

Figure 7A:
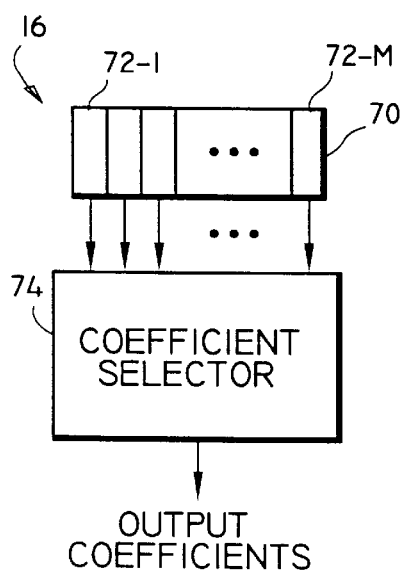
FIGS. 7A through 7E show exemplary implementations of an extractor suitable for use in a basis converter in accordance with the invention.
Figure 7B:
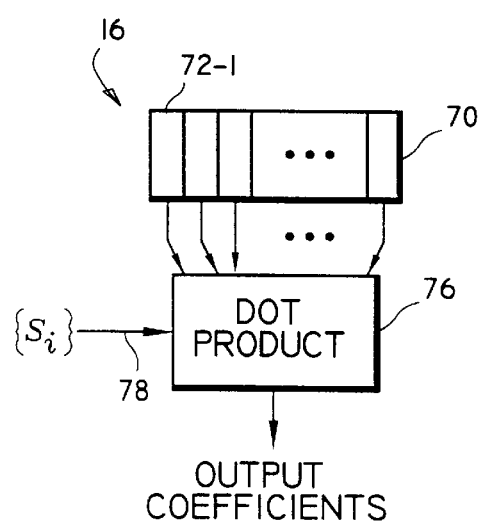

FIG. 7B shows an embodiment of extractor 16 in which the coefficient selection is implemented by a dot product element 76 which receives the outputs of the register 70. The dot product element 76 computes the dot product of the various outputs of register 70 in accordance with a set of values $\{s_i\}$ received on an input 78. The dot product is computed as the sum of the products $\{s_i t_i\}$ for i=1, 2, ... M, where $t_i$ designates the ith output of the register 70. The set of values $\{s_i\}$ is typically predetermined, and the dot product operation is carried out over a known field. Variations on this embodiment include the use of different sets of values $\{s_i\}$ for the computation of different coefficients.

Figure 7C:
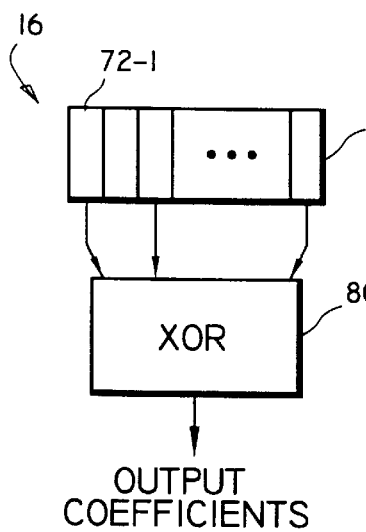

FIG. 7C illustrates an embodiment of extractor 16 suitable for use in computing coefficients for bases defined over GF(2) fields, in which the coefficient values are limited to $\{0, 1\}$. The dot product element 76 in this case is replaced with an XOR element 80 which generates a $\{0, 1\}$ coefficient by computing an exclusive-or of selected outputs of the register 70. The XOR element 80 may be implemented as a single gate or as a collection of gates, and may be combined with a suitable mechanism for coefficient selection. The FIG. 7C embodiment may be viewed as a special case of the more general FIG. 7B embodiment.

Figure 7D:
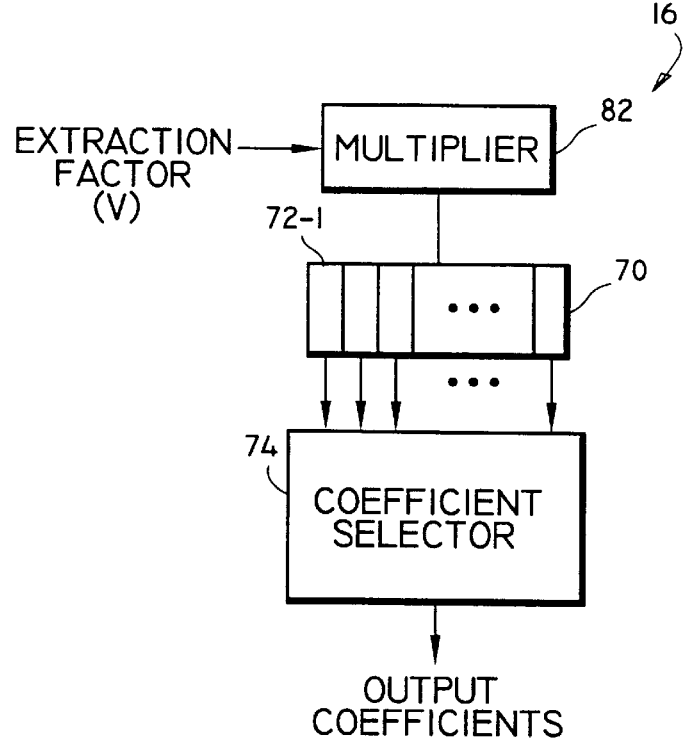

FIG. 7D shows an embodiment of the extractor 16 in which an extraction factor V is applied to a multiplier 82 which receives a rotated sequence from the externally shifted sequence generator 14. The rotated sequence is scaled in multiplier 82 by the extraction factor V, and the result is applied to the appropriate storage locations 72-i of the register 70. The outputs of the register 70 are applied to the coefficient selector 74 and processed in the manner previously described to generate output coefficients in the external basis representation B. The multiplier 82 operates in the internal basis, and may be part of a finite field arithmetic unit such as the arithmetic unit 50 of FIG. 4. The embodiment of FIG. 7D typically computes one or more coefficients, and may utilize different extraction factors V for different coefficients.

Figure 7E:
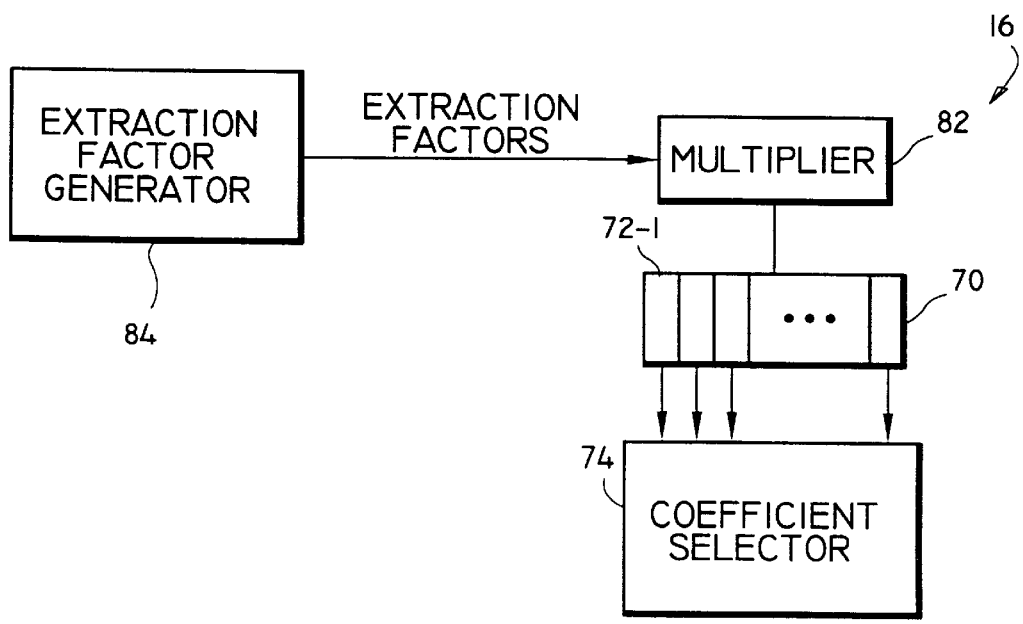

FIG. 7E shows an embodiment of the extractor 16 in which a series of extraction factors are generated by an extraction factor generator 84 and supplied to an input of the multiplier 82. The elements 70, 74 and 82 operate as previously described. The extraction factor generator may be implemented in the form of a dual-basis generator. The FIG. 7E embodiment is particularly well-suited for use in applications in which it is desirable to compute more than one coefficient using generated extraction factors, instead of storing extraction factors for each coefficient.

Figure 8A:
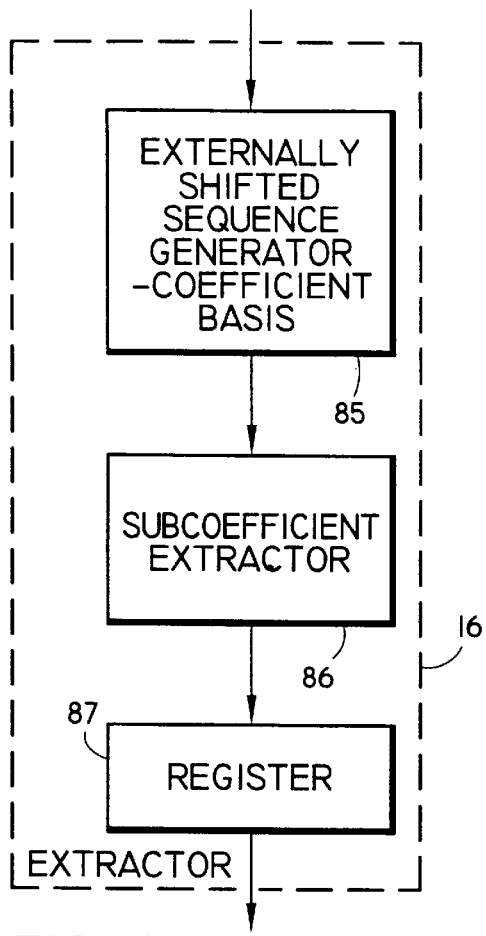
FIGS. 8A through 8C show other exemplary implementations of an extractor in accordance with the invention.
Figure 8B:
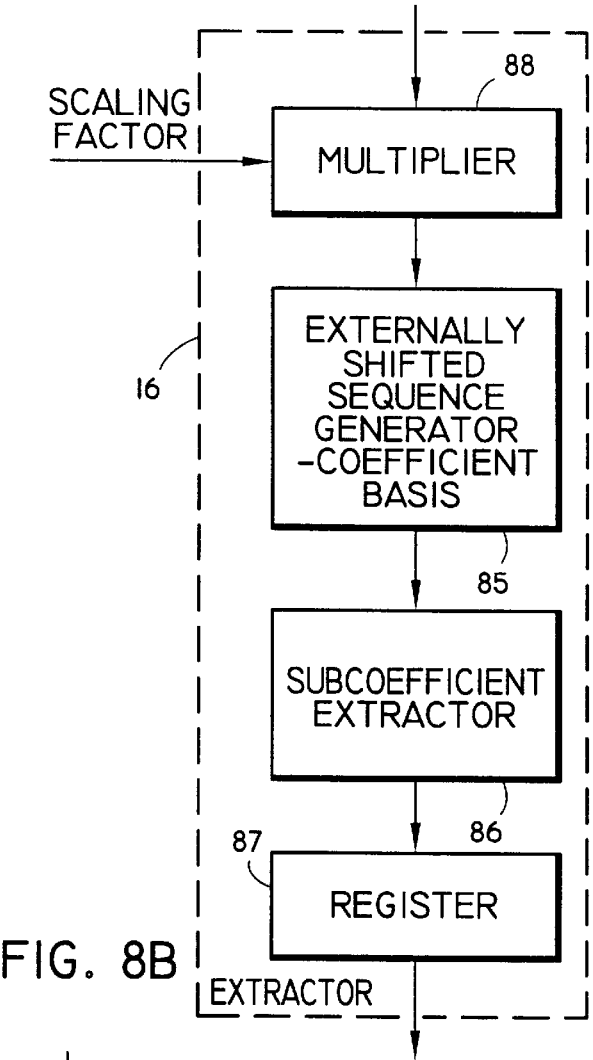
Figure 8C:
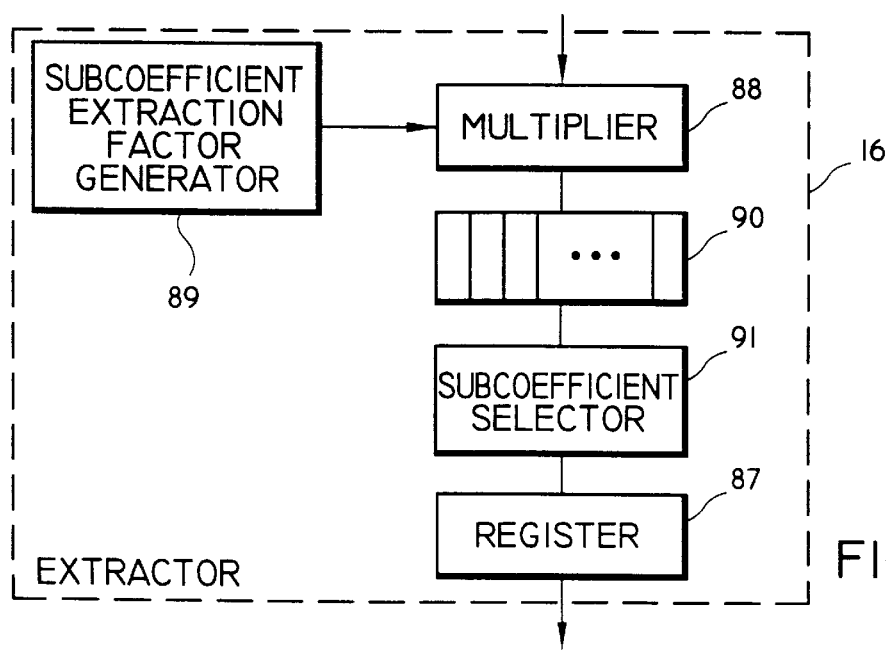

FIGS. 8A, 8B and 8C show other illustrative embodiments of the extractor 16. In the FIG. 8A and FIG. 8B embodiments, the extractor 16 includes an externally shifted sequence generator 85, a subcoefficient extractor 86 and a register 87. The externally shifted sequence generator 85 shifts in the external coefficient basis. That is, the externally shifted sequence generator 85 generates a sequence of intermediate values in the internal representation whose corresponding external representations are shifted in terms of the subcoefficients of at least one coefficient. The subcoefficient extractor 86 may be of the form of any one of the extractors previously described in conjunction with FIGS. 7A through 7E above. The externally shifted sequence generator 85 may be viewed as a second external shifter, for shifting in another manner, such that the subcoefficient extractor 86 yields one or more subcoefficients of the external basis representation B. The FIG. 8B embodiment includes a multiplier 88 which scales the input of extractor 16 by a scaling factor, but otherwise operates in a manner similar to the FIG. 8A embodiment. The FIG. 8C embodiment includes a multiplier 88, a register 90, a subcoefficient selector 91 and a register 87. A subcoefficient extraction factor generator 89 supplies extraction factors as inputs to the multiplier 88, such that the coefficient extraction may be implemented by selector 91. A variant of FIG. 8C may include premultiplication of the extractor input. Each of the embodiments of FIGS. 8A, 8B and 8C represents an extractor in the case where the internal basis and external basis have different ground fields. Each embodiment computes one or more subcoefficients, and stores the subcoefficients in a register to form one or more coefficients to be output. As is the case for other extractors, there may be overlap between the extractor circuitry and that of the externally shifted sequence generator. For example, the sequence generators of FIGS. 11A and 11B below include elements which may also be found in an extractor. The embodiments of FIGS. 8A, 8B and 8C are particularly well-suited for use in implementing conversion algorithms such as the conversion algorithms EXPORTPOLY2 and EXPORTNORMALPOLY to be described in detail below.

Variations on the general extractor embodiments described in conjunction with FIGS. 7A through 7E and FIGS. 8A through 8C include alternative embodiments in which different coefficients are computed in different ways. For example, some coefficients may be computed by selection, as in the FIG. 7A embodiment, while others are computed by multiplication followed by selection, as in the FIGS. 7D and 7E embodiments. Also, it should be noted that an extractor in accordance with the invention may have a recursive structure which contains within itself an externally shifted sequence generator and a coefficient extractor, using techniques similar to those described above.

Figure 9:
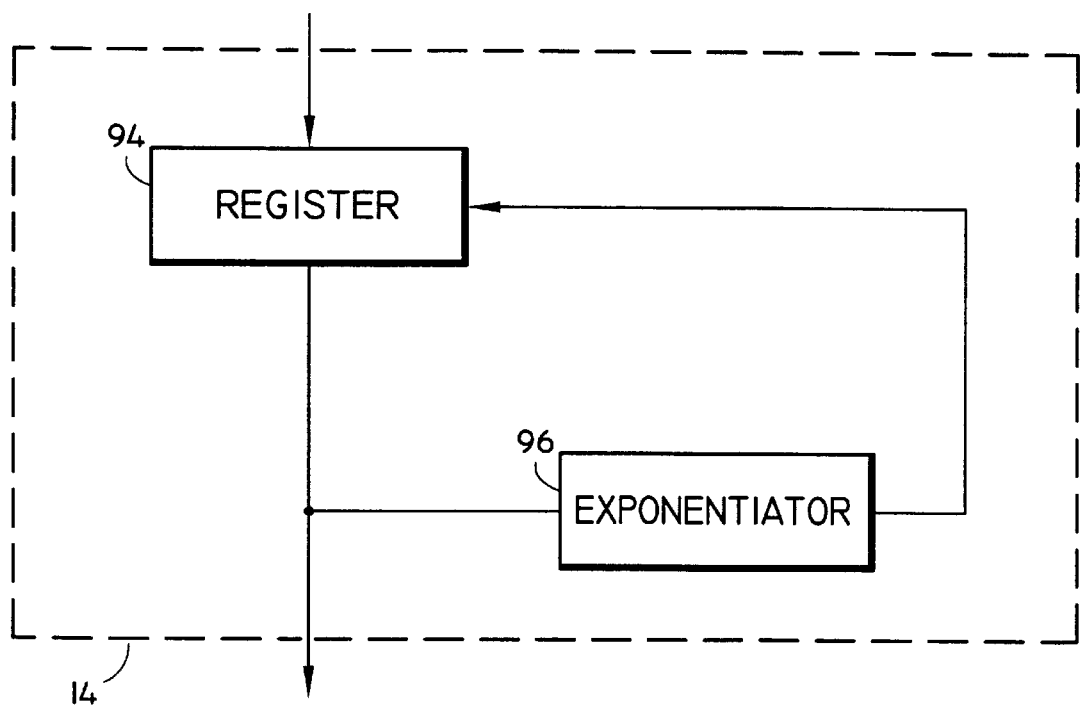
FIG. 9 shows an exemplary implementation of an externally shifted sequence generator suitable for use in a basis converter in accordance with the invention.

FIG. 9 shows an exemplary externally shifted sequence generator 14 suitable for use in the rotate/extract basis converter 12. The externally shifted sequence generator 14 of FIG. 9 is designed for use in providing external shift operations for an external representation having a normal basis, and includes a register 94 and an exponentiator 96. The register 94 receives as an input the internal basis representation A, and generates an output sequence which, when applied to an extractor 16, yields coefficients of the external basis representation B. The output of register 94 is supplied to an input of the exponentiator 96. The exponentiator 96 performs the computation $A \leftarrow A^e$ for a fixed exponent e, in the internal basis. The value of e generally depends on the external basis, but typically equals the ground field order q. The register 94 may be incorporated within the exponentiator in alternative embodiments, and may be arranged between different stages of an exponentiation process. Any of a number of different exponentiation techniques may be utilized in the exponentiator 96. It should also be noted that other types of externally shifted sequence generators could be utilized for normal basis representations.

Depending on the internal basis, the exponentiation process could be carried out, in part or completely, with ordinary internal-basis rotations. In general, if m external basis coefficients are to be recovered by the rotate/extract basis converter 14, the exponentiator 96 could exponentiate m−1 times, such that one coefficient could be extracted from each output, including the original input. By exponentiating once more, the final output may in some cases equal the original input, and therefore could be used to restore that input. Alternatively, the exponentiator 96 could exponentiate (m−1)/2 times for an odd m or m/2−1 times for an even m, such that two coefficients could be extracted from each output, including the original input. More generally, roughly m/k−1 exponentiations could be performed in order to extract k coefficients from each output. With the convention that the coefficients in the external normal-basis representation are ordered according to increasing powers of the generator, the computation $A \leftarrow A^q$ corresponds to a right rotation in the external representation. In other words, the external shifting operation is a right rotation. Variations of the general embodiment of the externally shifted sequence generator described in conjunction with FIG. 9 include alternative embodiments in which the generator computes the left rotation, right shift, or left shift of the external basis representation, although the generator that computes the right rotation as described above is in general the most efficient one.

Figure 10:
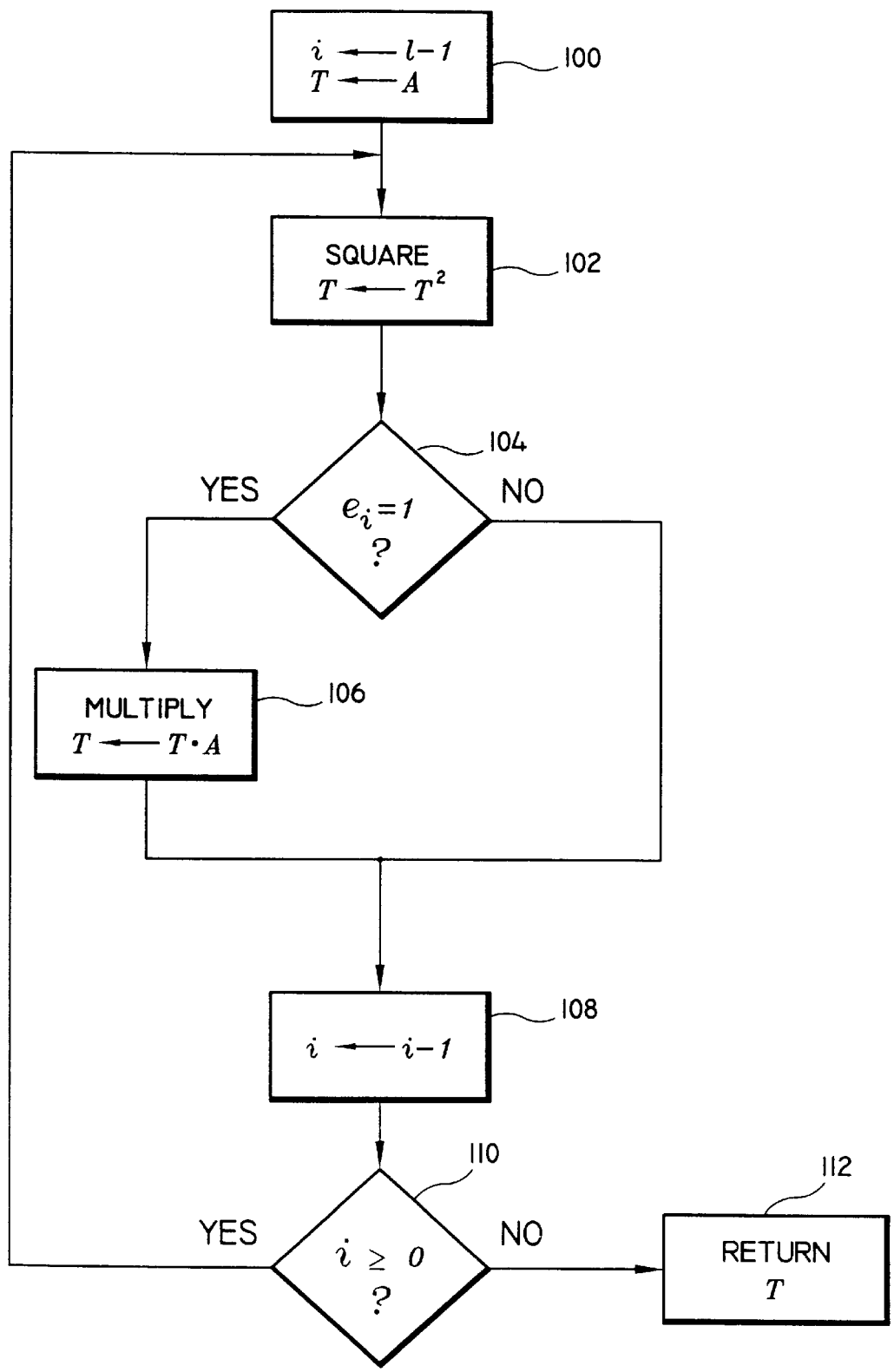
FIG. 10 is a flow diagram illustrating the operation of an exponentiator in the externally shifted sequence generator of FIG. 9.

FIG. 10 is a flow diagram illustrating the operation of an exemplary square-and-multiply exponentiation process suitable for use in the exponentiator 96 of the externally shifted sequence generator 14 of FIG. 9. The fixed exponent e is a binary sequence of the form $<e_l e_{l-1} e_{l-2} \ldots e_0>$ with $e_l = 1$. In step 100, an index variable i is assigned the value l−1 and the variable T is assigned the values of the input internal basis representation A. Step 102 is a squaring operation in which T is replaced with the values associated with $T^2$. In step 104, a decision is made as to whether the ith element $e_i$ of the binary sequence e is equal to a binary "1." If it is, T is multiplied by A as shown in step 106. If the ith element $e_i$ of the binary sequence e is equal to a binary "0," the process proceeds to step 108 without performing the multiplication step 106. In step 108, the index i is decremented by one. A decision is made in step 110 as to whether the resulting index i is greater than or equal to zero. If the new index i is greater than or equal to zero, the process returns to step 102 and is repeated with the new i value. If the new index i is less than zero, the process is completed by returning the current T in step 112. The square-and-multiply exponentiation operations of FIG. 10 could be performed in a finite field arithmetic unit coupled to the externally shifted sequence generator 14, such as the arithmetic unit 50 of FIG. 4.

Figure 11A:
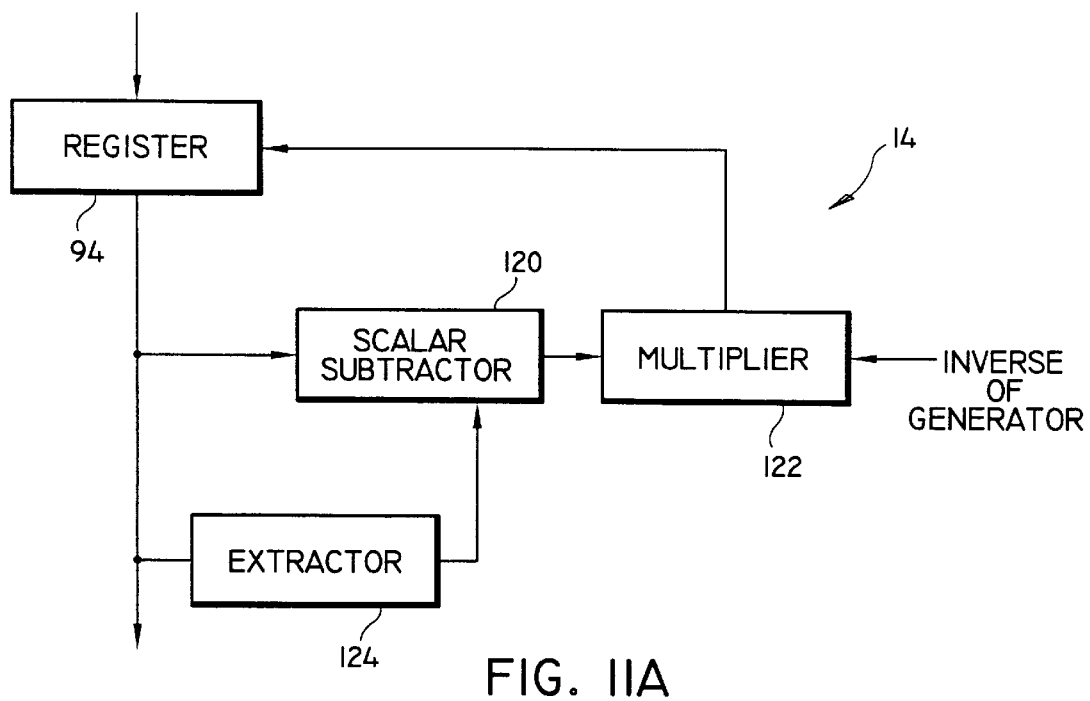
FIGS. 11A and 11B show alternative embodiments of an externally shifted sequence generator in accordance with the invention.
Figure 11B:
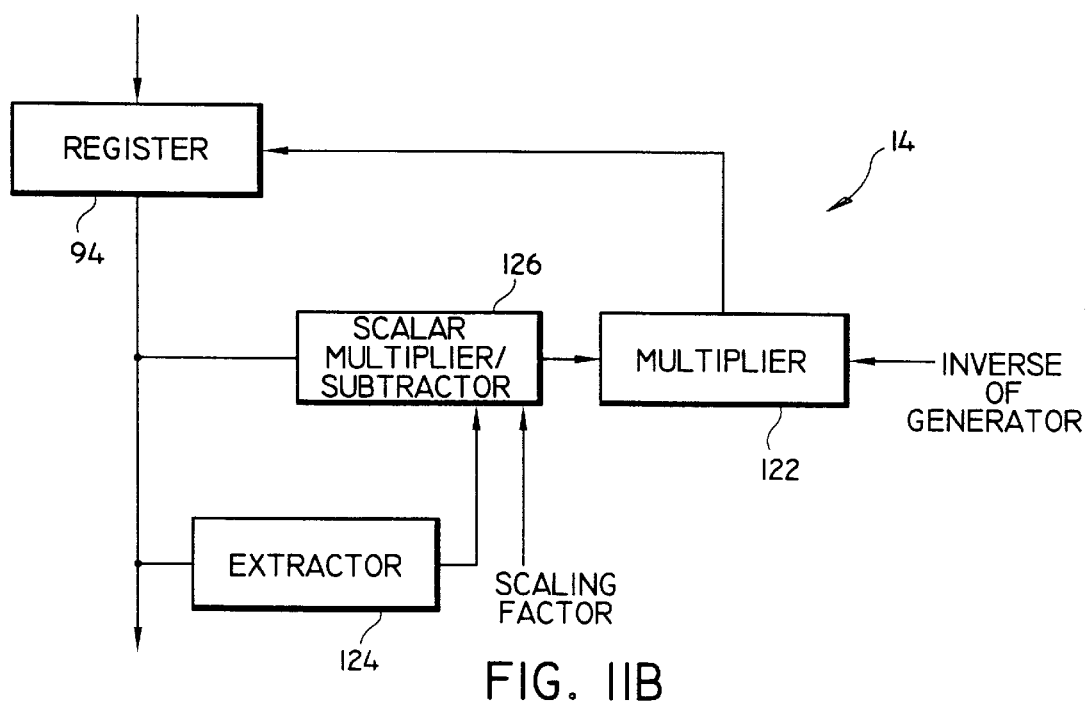

FIGS. 11A and 11B show embodiments of an externally shifted sequence generator 14 suitable for an external representation having a polynomial basis. In the FIG. 11A embodiment, the register 94 which contains the input representation A has its output coupled to an input of a scalar subtractor 120. The output of the scalar subtractor 120 is applied to an input of a multiplier 122 which also receives $G^{-1}$, the internal basis representation of the inverse of the external basis generator. The scalar subtractor 120 and multiplier 122 together perform the computation $A \leftarrow (A-tI) G^{-1}$, where t is an extracted coefficient and I is the identity element in the internal representation. In the case that the internal and external ground fields are different, the computation may involve more than one step, typically one per subcoefficient. The extracted coefficient t is supplied to the scalar subtractor 120 by an extractor 124 which is incorporated into the externally shifted sequence generator 14 as illustrated in FIG. 5. The functions of the extractor 124 could alternatively be provided by the extractor 16 of the rotate/extract basis converter 12. In general, if m coefficients are to be recovered in the corresponding basis converter, the sequence generator could be iterated about m/k−1 times to recover k coefficients from each output of the externally shifted sequence generator 14. Typically, the multiplier 122 multiplies by $G^{-1}$. In addition, the multiplier 122 could multiply by $G^{-k}$, and in this case more than one coefficient would need to be subtracted when updating the value A. The scalar subtractor 120 may be part of the extractor 124 in alternative embodiments. The multiplier 122 may be implemented in a finite field arithmetic unit coupled to the externally shifted sequence generator 14, such as the arithmetic unit 50 of FIG. 4.

FIG. 11B shows an embodiment of the externally shifted sequence generator 14 suitable for an external representation having a scaled polynomial basis. The scalar multiplier 120 is replaced in the FIG. 11B embodiment with a scalar multiplier/subtractor 126 which receives as an input a scaling factor V. The scaling factor V is typically the same one used to scale the polynomial basis, such that the basis may be V, GV, $G^2 V, \ldots G^{m-1} V$. The scalar multiplier/subtractor 126 and multiplier 122 together perform the computation $A \leftarrow (A-tV) G^{-1}$. The extracted coefficient t is supplied to the scalar multiplier/subtractor 126 by the extractor 124 as in the FIG. 11A embodiment. In the case that the internal and external ground fields are different, the computation may involve more than one step, typically one per subcoefficient. An advantage of the FIG. 11B embodiment is that the extractor 124 and the external extractor 16, if distinct, can be simplified, typically to a coefficient selector, for appropriate values of V. In order to provide further improvements in computational efficiency, {tV} values for various extracted coefficients t could be precomputed and stored. The externally shifted sequence generator 14 of FIG. 11B is well-suited for use in implementing the EXPORTPOLY algorithm to be described in detail below, and may be applied to either an external basis or an external coefficient basis. With the convention that the coefficients in the external polynomial-basis representation for FIG. 11A or the external scaled polynomial-basis representation for FIG. 11B are ordered according to decreasing powers of the generator, the computation $A \leftarrow (A-tI) G^{-1}$ in FIG. 11A or $A \leftarrow (A-tV) G^{-1}$ in FIG. 11B corresponds to a right shift operation in the external representation. In other words, the external shifting operation is a right shift. Variations of the general embodiment of the externally shifted sequence generator described in conjunction with FIGS. 11A and 11B include alternative embodiments in which the generator computes the left rotation, right rotation, or left shift of the external basis representation, although the generator that computes the right shift as described above is in general the most efficient one. As described in conjunction with FIG. 2B above, some steps of these computations may be combined with computations in the extractor.

Figure 12:
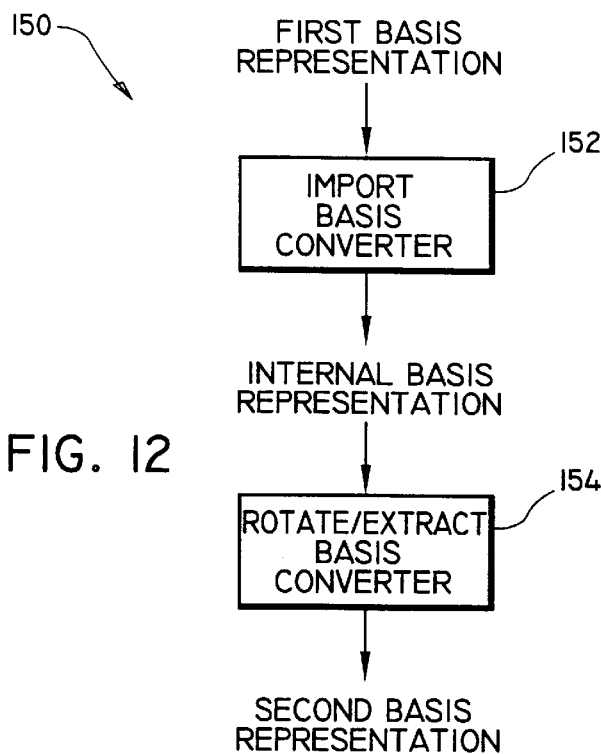
FIGS. 12, 13 and 14 show exemplary applications of a rotate/extract basis converter in accordance with the invention.
Figure 13:
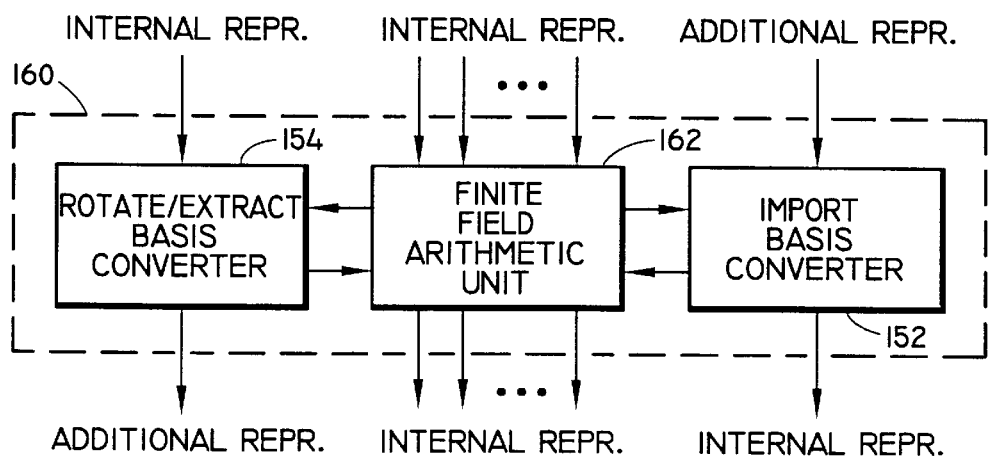
Figure 14:
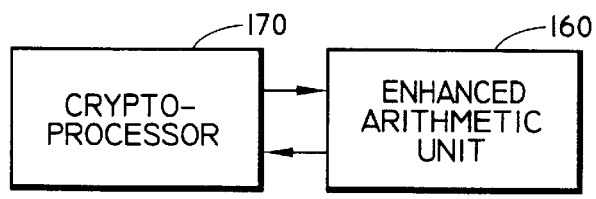

FIGS. 12, 13 and 14 show exemplary applications of the rotate/extract basis converter of the present invention. FIG. 12 shows a basis converter 150 which includes an import basis converter 152 and a rotate/extract basis converter 154. The import basis converter receives a first basis representation as an input, and converts the first basis representation to an internal basis representation using operations in the internal basis. The rotate/extract basis converter 154 converts the internal basis representation to a second basis representation in the manner previously described. The basis converter 150 thus provides general conversion from a first to a second basis representation using an internal basis representation. FIG. 13 shows an enhanced finite field arithmetic unit 160 which includes basis conversion capabilities in accordance with the present invention. The enhanced arithmetic unit 160 includes the import basis converter 152 and is rotate/extract basis converter 154 described in conjunction with FIG. 12, as well as a finite field arithmetic unit 162 such as the arithmetic unit 50 of FIG. 4. The enhanced arithmetic unit 160 supports finite field arithmetic operations in an internal basis as well as an additional basis, and may include more than the one set of basis converters shown. In alternative embodiments, the import basis converter 152 may be eliminated. FIG. 14 illustrates that the enhanced arithmetic unit 160 may be coupled to a cryptographic processor 170 in order to support cryptographic operations in multiple bases. Numerous other applications of the rotate/extract basis converter of the present invention are also possible. Specific conversion algorithms which may be implemented by basis converters in accordance with the present invention will now be described in detail.

2.0 Conversion Algorithms for Common Internal and External Ground Fields

The exemplary basis converter 12 of FIG. 1 and other embodiments of the invention implement basis conversion algorithms involving a modest number of operations primarily or exclusively in the one basis, and requiring minimal storage. The basis in which finite field operations are primarily performed will be referred to as the internal basis. The other basis will be referred to as the external basis. A conversion operation from the external basis to the internal basis with thus be an import operation; and the reverse an export operation. As noted above, the rotate/extract basis converter 12 of FIG. 1 is configured to perform export operations. It will be assumed that the following operations are readily available in the internal basis, where T, U and V are all internal representations of elements of the finite field:

1. assignment: $T \leftarrow U$
2. zero assignment: $T \leftarrow 0$
3. addition: $T \leftarrow U+V$
4. subtraction: $T \leftarrow U-V$
5. multiplication: $T \leftarrow U \times V$
6. scalar multiply-and-add: $T \leftarrow U+c \times V$, where c is an element of the ground field; as a special case, scalar addition: $T \leftarrow U+c \times I$, where I is the identity element
7. scalar multiply-and-subtract: $T \leftarrow U-c \times V$, and as a special case, scalar subtraction: $T \leftarrow U-c \times I$ The specific problems to be solved in the context of basis conversion thus include an import problem and an export problem. The import problem may be characterized as follows: Given an internal basis and an external basis for a finite field $GF(q^m)$ and a representation B of a field element in the external basis (i.e., an external representation), determine the corresponding representation A of the same field element in the internal basis (i.e., an internal representation) primarily with internal-basis operations. The export problem may be characterized as follows: Given an internal basis and an external basis for a finite field $GF(q^m)$ and the internal representation A of a field element, determine the corresponding external representation B of the same field element primarily with internal-basis operations. The more general problem of converting from one basis to another with operations in a third basis is readily solved by importing to and re-exporting from the third basis. The algorithms described herein for converting to and from an internal basis can therefore be readily extended to cover the more general problem.

In the exemplary conversion algorithms to be described in this section, both the internal and external bases are defined over the same ground field GF(q), and the coefficients in the ground field are represented the same way in both bases. Algorithms described in other sections will address cases in which the internal and external bases are defined over different ground fields, or the coefficients are represented differently. It will also be assumed without limitation that the external basis is either a polynomial basis or a normal basis, so that elements have either the form $$\epsilon = \sum_{i=0}^{m-1} B[i]\gamma^i$$

or the form $$\epsilon = \sum_{i=0}^{m-1} B[i]\gamma^{q^i}$$

where $\gamma$ is the generator of the external basis and $B[0], \ldots, B[m-1] \in GF(q)$ are the coefficients of the external representation. Conversion to and from the other common type of basis, the dual basis, will be covered in a separate section below. In addition, it is assumed that the internal representation G of the generator is given, which is a reasonable assumption in many practical applications. If the internal representation G of the generator is not given, it can be computed using information about the internal and external bases. Though there may be several internal representations of the generator that satisfy known conditions on the generator, such as its minimal polynomial, interoperability generally requires only that conversion into and out of the internal basis involve the same choice of the representation G.

No assumptions are made regarding the internal basis, other than that it is defined over the ground field GF(q). The algorithms described herein generally involve a similar sequence of operations whether the internal basis is a polynomial basis, a normal basis, or some other type of basis. Thus, as examples, the algorithms can convert from a polynomial basis to a normal basis, from a normal basis to a polynomial basis, from a polynomial basis with one generator to a polynomial with another generator, or from a normal basis with one generator to a normal basis to another generator. Numerous other conversion applications are also possible.

The algorithms for importing from an external basis are based on a direct computation of the last two equations given above. The algorithms for exporting involve two additional observations to be described below. The first observation may be stated as follows. If the external basis is a polynomial basis, then multiplication by the inverse $\gamma^{-1}$ of the generator $\gamma$ shifts the coefficients down, provided that the coefficient at index 0 is initially 0. Specifically, let B be the external representation of an element $\epsilon$, and let B' be the external representation of the element $\epsilon\gamma^{-1}$. Then for all indexes $i < m-1$, $$B'[i]=B[i+1]$$

provided that $B[0]=0$. Note that $B'[m-1]=0$, and that multiplication by the generator $\gamma$ shifts coefficients up, provided that $B[m-1]=0$. Rotation of the coefficients in either direction is also possible, though generally not required for the exemplary algorithms.

The second observation may be stated as follows. If the external basis is a normal basis, then raising to the power q shifts the coefficients up. Specifically, let B be the external representation of an element $\epsilon$, and let B' be the external representation of the element $\epsilon^q$. Then for all indexes $i > 0$, $$B'[i]=B[i-1].$$

Note also that $B'[0]=B[m-1]$.

The first observation above leads to the following general algorithm for exporting to a polynomial basis: compute the coefficient $B[0]$, subtract $B[0]$, multiply by $G^{-1}$, and repeat, computing successive coefficients of B. The second observation leads to the following general algorithm for exporting to a normal basis: compute the coefficient B[m−1], raise to the power q, and repeat.

A technique for obtaining the coefficient B[0] or B[m−1] will now be described. From the fact that the coefficients of the internal and external representations are related by a change-of-basis matrix M as $$B^T = M^{-1} A^T$$

it follows that a coefficient B[i] can be obtained by a linear combination $$B[i] = \sum_{j=0}^{m-1} M^{-1}[i,j] A[j]$$

where the values $M^{-1}[i,j] \in GF(q)$ are elements of the matrix $M^{-1}$. A coefficient B[i] can thus be obtained by operations over the ground field. The coefficient may also be computed using internal-basis operations, as will be described below.

It will be assumed that any linear function of coefficients of the internal representation of an element may be computed with internal-basis operations. Specifically, let $s_0, \ldots, s_{m-1}$ be elements of GF(q), let $K_0$ be the multiplication matrix computing the coefficient at index 0 of a product in the internal representation, and let V be defined as $$V^t = K_0^{-1} [S_0 \ldots S_{m-1}]^T$$

viewing V as a row vector. Then for all A, if T=A×V, then $$T[0] = \sum_{j=0}^{m-1} A[j] s_j$$

Since the multiplication matrix is invertible, the element V exists. By definition of multiplication, $T[0] = A \, K_0 \, V^T$. It follows directly that T[0] equals the desired linear function. In the following description, $V_i$ denotes the value such that $T[0]=B[i]$ where $T=A \times V_i$, i.e., the one where the values $S_0, \ldots, S_{m-1}$ are the matrix row $M^{-1}[i,0], \ldots, M^{-1}[i,m-1]$. Like the generator G, a value $V_i$ is generally particular to an external basis; a different set of values $V_i$ would typically be needed for each external basis with which one might want to convert.

Four exemplary conversion algorithms will now be described, for importing and exporting with external polynomial and normal bases. The algorithms are presented in a form of pseudocode, but are easily adapted to a wide variety of software and hardware implementations.

2.1 Importing From a Polynomial Basis

The algorithm IMPORTPOLY converts from a polynomial-basis representation to an internal representation over the same ground field, primarily with internal-basis operations.

| | |
|---|---|
| Input: | B[0], . . . ,B[m−1], the external representation to be converted |
| Output: | A, the corresponding internal representation |
| Parameters: | m, the degree of the finite field |
| Constants: | G, the internal representation of the generator of the external basis |
| Algorithm: | proc IMPORTPOLY<br>    A ← 0<br>    for i from m−1 downto 0 do<br>        A ← A × G<br>        A ← A + B[i] × I<br>    endfor<br>endproc |

The above algorithm processes one coefficient per iteration, scanning from highest index to lowest, accumulating powers of G. It involves m multiplications and m scalar additions, and requires storage for one constant.

Examples using simple test vectors will be presented to illustrate the operation of IMPORTPOLY and the other algorithms to be described in Section 2. For these examples, it will be assumed that when the external representation is polynomial basis, then the internal representation is normal basis, and vice versa. It will also be assumed that the ground field is GF(2), that is, q=2. An exemplary finite field $F_{2^4}$ is defined using a polynomial basis representation as follows. Take $f(x)=x^4+x+1$ over $F_2$. It can be verified that $f(x)$ is irreducible over $F_2$. Then the elements of $F_{2^4}$ are:

(0000) (0001) (0010) (0011) (0100) (0101) (0110) (0111)
(1000) (1001) (1010) (1011) (1100) (1101) (1110) (1111)

and field multiplication is carried out modulo the polynomial $f(x)$. The field $F_{2^4}$ can be generated by one element, $x=(0010)_P$. The basis consists of $1, x, x^2$ and $X^3$. The element $\alpha=x=(0010)_P$ is a primitive element in this representation. The generator of the basis is $\alpha$. The powers of $\alpha$ for this exemplary polynomial basis representation are:

$$\alpha^0 = (0001)_P \; \alpha^1 = (0010)_P \; \alpha^2 = (0100)_P \; \alpha^3 = (1000)_P$$

$$\alpha^4 = (0011)_P \; \alpha^5 = (0110)_P \; \alpha^6 = (1100)_P \; \alpha^7 = (1011)_P$$

$$\alpha^8 = (0101)_P \; \alpha^9 = (1010)_P \; \alpha^{10} = (0111)_P \; \alpha^{11} = (1110)_P$$

$$\alpha^{12} = (1111)_P \; \alpha^{13} = (1101)_P \; \alpha^{14} = (1001)_P \; \alpha^{15} = \alpha^0 = (0001)_P$$

The finite field $F_{2^4}$ may be defined using a normal basis representation as follows. Take $f(x)=x^4+x^3+x^2+x+1$ over $F_2$. It can be verified that $f(x)$ is a normal polynomial over $F_2$. Then the field $F_{2^4}$ can be generated by one element, $x=(0001)_N$. The basis consists of $x, x^2, x^4$ and $x^8$. The primitive element may be represented as $\alpha=(1100)_N$. The generator of the basis is thus $\alpha^9$. The powers of $\alpha$ for this exemplary normal basis representation are:

$$\alpha^0 = (1111)_N \; \alpha^1 = (1100)_N \; \alpha^2 = (0110)_N \; \alpha^3 = (0100)_N$$

$$\alpha^4 = (0011)_N \; \alpha^5 = (1010)_N \; \alpha^6 = (0010)_N \; \alpha^7 = (0111)_N$$

$$\alpha^8 = (1001)_N \; \alpha^9 = (1000)_N \; \alpha^{10} = (0101)_N \; \alpha^{11} = (1110)_N$$

$$\alpha^{12} = (0001)_N \; \alpha^{13} = (1101)_N \; \alpha^{14} = (1011)_N \; \alpha^{15} = \alpha^0 = (1111)_N$$

It can be verified that the powers of $\alpha$ are in correspondence. For instance, $\alpha^1+\alpha^2=\alpha^5$ in both the polynomial basis representation and the normal basis representation.

In an example of the operation of IMPORTPOLY, $G=\alpha=(1100)_N$. Let $B=\alpha^7=(1011)_P$ be an element represented in polynomial basis. Initially, $A=(0000)_N$. The following table illustrates the processing steps in accordance with the IMPORTPOLY algorithm.

| i | A ← A × G | B[i] | A ← A + B[i] × I |
|---|---|---|---|
| 3 | $(0000)_N$ | 1 | $(1111)_N$ |
| 2 | $(1100)_N$ | 0 | $(1100)_N$ |
| 1 | $(0110)_N$ | 1 | $(1001)_N$ |
| 0 | $(1000)_N$ | 1 | $(0111)_N$ |

After conversion, $A=(0111)_N$ is the element $\alpha^7$ represented in normal basis.

Exemplary optimizations of the above algorithm are as follows. In the case that the ground field is GF(2), as in the foregoing example, the step A←A+B[i]×I can be implemented as the conditional operation if B[i]=1 then A←A+I where I is the internal representation of the identity element, thereby avoiding the scalar addition in half the cases on average. It is possible to reduce the number of iterations of the loop and thereby improve performance by processing more than one coefficient per iteration. For instance, in the case that m is even, the loop may be changed to:

```
for i from m/2 - 1 downto 0 do
    A ← A × G²
    A ← A + B[2i + 1] × G + B[2i] × I
endfor
```

The case in which m is odd involves an extra step before the loop. This approach can be generalized to process any number of coefficients at each iteration. The additional values such as $G^2$ can either be precomputed and stored as constants, or computed as part of the algorithm, since the power of G is relatively small. An alternative optimization is to change the loop to:

```
for i from m/2 - 1 downto 0 do
    A ← A × G
    A ← A + B[i + m/2] × G^(m/2) + B[i] × I
endfor
``` though in this case it may be preferable to precompute the value $G^{m/2}$, since the power is larger. To further reduce the number of operations, one could bring the first iteration out of the loop, starting with A←B[m−1]×I or more generally, the algorithm could scan the external representation for the first nonzero coefficient before starting the loop. It is also possible to process coefficients from lowest index to highest, computing and adding powers of G. This form involves a similar number of operations as the basic algorithm given above, but does not admit the optimization where more than one coefficient is processed per iteration.

2.2 Importing from a Normal Basis

The algorithm IMPORTNORMAL converts from a normal-basis representation to an internal representation over the same ground field, primarily with internal-basis operations.

| | |
|---|---|
| Input: | B[0], . . . ,B[m−1], the external representation to be converted |
| Output: | A, the corresponding internal representation |
| Parameters: | m, the degree of the finite field; q, the order of the ground field |
| Constants: | G, the internal representation of the generator of the external basis |
| Algorithm: | proc IMPORTNORMAL<br>    A ← 0<br>    for i from m−1 downto 0 do<br>        A ← A^q<br>        A ← A + B[i] × G<br>    endfor<br>endproc |

The algorithm processes one coefficient per iteration, scanning from highest index to lowest, accumulating successive powers of G. The operation $A \leftarrow A^q$ corresponds to up-rotation in the external representation. The algorithm involves m exponentiations to the power q and m scalar multiply-and-adds, and requires storage for one constant, in addition to the intermediate results for exponentiation. The exponentiation will typically involve about $1.5 \log_2 q$ multiplications and require storage for one intermediate result, though better performance is possible if the internal basis is a normal basis.

An example will now be given, in which $G=\alpha^9=(1010)_P$. Let $B=\alpha^7=(0111)_N$ be an element represented in normal basis. Initially, $A=(0000)_P$. The following table illustrates the processing steps in accordance with the IMPORTNORMAL algorithm.

| i | A ← A² | B[i] | A ← A + B[i] × G |
|---|---|---|---|
| 3 | $(0000)_P$ | 1 | $(1010)_P$ |
| 2 | $(1000)_P$ | 1 | $(0010)_P$ |
| 1 | $(0100)_P$ | 1 | $(1110)_P$ |
| 0 | $(1011)_P$ | 0 | $(1011)_P$ |

After conversion, $A=(1011)_P$ is the element $\alpha^7$ represented in polynomial basis.

Exemplary optimizations to the above algorithm are as follows. In the case that the ground field is GF(2), as in the foregoing example, the step A←A+B[i]×G can be implemented as the conditional operation if B[i]=1 then A←A+G thereby avoiding the scalar multiply-and-add in half the cases on average. It is possible to reduce the number of iterations of the loop and thereby improve performance by processing more than one coefficient per iteration. For instance, in the case that m is even, one can change the loop to:

```
for i from m/2 - 1 downto 0 do
    A ← A^q
    A ← A + B[i + m/2] × Gq^(m/2) + B[i] × G
endfor
```

The case that m is odd involves an extra step before the loop. This approach can be generalized to process any number of coefficients at each iteration. The additional values such as should generally be precomputed and stored as constants, except if raising to the power q is efficient, e.g., if the internal basis is also a normal basis. To further reduce the number of operations, one could bring the first iteration out of the loop, starting with A←B[m−1]×G or more generally, the algorithm could scan the external representation for the first nonzero coefficient before starting the loop. It is also possible to process coefficients from lowest index to highest, computing and adding successive powers of G. This form involves a similar number of operations as the basic algorithm given, but does not admit the optimization where more than one coefficient is processed per iteration.

2.3 Exporting to a Polynomial Basis

The algorithm EXPORTPOLY converts from an internal representation to a polynomial-basis representation over the same ground field, primarily with internal-basis operations.

| | |
|---|---|
| Input | A, the internal representation to be converted |
| Output: | B[0], . . . ;B[m−1], the corresponding external representation |
| Parameters: | m, the degree of the finite field |
| Constants: | $G^{-1}$, the internal representation of the inverse of the generator of the external basis; $V_0$, the value such that if T = A × $V_0$, then T[0] = B[0] |
| Algorithm: | proc EXPORTPOLY<br>    A ← A × $V_0$<br>    for i from 0 to m−1 do<br>        B[i] ← A[0]<br>        A ← A − B[i] × $V_0$<br>        A ← A × $G^{-1}$<br>    endfor<br>endproc |

The algorithm computes one coefficient per iteration, applying the observations previously given, with the additional enhancement of premultiplying by the value $V_0$. This is the reason that the correction step involves subtracting the value B[i]×$V_0$ rather than B[i]. The alternative to premultiplying A by $V_0$ is to multiply it by $V_0$ during each iteration before computing the coefficient B[i]; but this involves an additional multiplication per iteration. The algorithm involves m+1 multiplications and m scalar multiply-and-subtracts, and requires storage for two constants. The input A is modified by the algorithm.

An example will now be given, in which $G=\alpha=(1100)_N$, $G^{-1}=\alpha^{14}=(1011)_N$ and $V_0=\alpha=(1100)_N$. Let $A=\alpha^7=(0111)_N$ be an element represented in normal basis. Initially, $A \leftarrow A \times V_0=(1001)_N$. The following table illustrates the processing steps in accordance with the EXPORTPOLY algorithm.

| i | B[i] ← A[0] | A ← A − B[i] × $V_0$ | A ← A × $G^{-1}$ | $AV_0^{-1}$ in Polynomial Basis |
|---|---|---|---|---|
| 0 | 1 | $(0101)_N$ | $(1000)_N$ | $(0101)_P$ |
| 1 | 1 | $(0100)_N$ | $(0110)_N$ | $(0010)_P$ |
| 2 | 0 | $(0110)_N$ | $(1100)_N$ | $(0001)_P$ |
| 3 | 1 | — | — | — |

After conversion, $B=(1011)_P$ is the element $\alpha^7$ represented in polynomial basis. The external shifting can be seen by examining the polynomial-basis representations in the last column of the above table. It should be noted that the scaling factor $V_0$ must be taken into effect, that is, the external shifting is in the scaled polynomial basis.

Exemplary optimizations of the above algorithm are as follows. The step by which the coefficient B[i] is computed could be implemented in its basic form as a linear combination (e.g., a parity relation over GF(2)), though this would be beneficial only if the linear combination can be computed more efficiently than a multiplication in the internal basis. In the case that the ground field is GF(2), as in the example, the step $A \leftarrow A - B[i] \times V_0$ can be implemented as the conditional operation if $B[i]=1$ then $A \leftarrow A + V_0$ thereby avoiding the scalar multiply-and-subtract in half the cases on average. It is possible to reduce the number of iterations of the loop by computing more than one coefficient per iteration. For instance, in the case that m is even, one can change the loop to:

```
for i from 0 to m/2 − 1 do
    B[i] ← A[0]
    A ← A − B[i] × $V_0$
    T ← A × $V_{m/2}V_0^{-1}$
    B[i + m/2] ← T[0]
    A ← A × $G^{-1}$
endfor
```

The performance improvement is a reduction in the number of correction steps; the total number of multiplications is not reduced. It should be noted that the value T could potentially be computed in parallel with the new value of A. This approach can be generalized to compute any number of coefficients at each iteration. To further reduce the number of operations, one could bring the last iteration out of the loop, ending with $B[m-1] \leftarrow A[0]$. It is also possible to compute coefficients from highest index to lowest, subtracting a value of the form $B[i]V_{m-1}G^{m-1}$ and multiplying by G at each iteration. This has the advantage that it can share the constant G with the import algorithm, but the disadvantage that it also requires the values $V_{m-1}$ and $V_{m-1}G^{m-1}$. The optimization of computing more than one coefficient per iteration applies to this alternative as well.

2.4 Exporting to a Normal Basis

The algorithm EXPORTNORMAL converts from an internal representation to a normal-basis representation over the same ground field, primarily with internal-basis operations.

Input: A, the internal representation to be converted
Output: B[0], . . . ,B[m−1], the corresponding external representation
Parameters: m, the degree of the finite field; q, the order of the finite field
Constants: $V_{m-1}$, the value such that if $T = A \times V_{m-1}$, then $T[0] = B[m-1]$
Algorithm: proc EXPORTNORMAL
  for i from m−1 downto 0 do
    T ← A × $V_{m-1}$
    B[i] ← T[0]
    A ← $A^q$
  endfor
endproc The algorithm computes one coefficient per iteration, applying the observations previously given. The algorithm involves m exponentiations to the power q and m multiplications, and requires storage for one constant and one intermediate result, T. in addition to the intermediate results for exponentiation. The exponentiation will typically involve about $1.5\log_2 q$ multiplications and require storage for one intermediate result, though better performance is possible if the internal basis is a normal basis. The input A, though modified by the algorithm, returns to its initial value.

An example will now be given, in which $V_{m-1}=V_3=\alpha^0=(0001)_P$. Let $A=\alpha^7=(1011)_P$ be an element represented in polynomial basis. The following table illustrates the processing steps in accordance with the EXPORTNORMAL algorithm.

| i | T ← A × $V_{m-1}$ | B[i] ← T[0] | A ← $A^2$ | A in Normal Basis |
|---|---|---|---|---|
| 3 | $(1011)_P$ | 1 | $(1001)_P$ | $(1011)_N$ |
| 2 | $(1001)_P$ | 1 | $(1101)_P$ | $(1101)_N$ |
| 1 | $(1101)_P$ | 1 | $(1110)_P$ | $(1110)_N$ |
| 0 | $(1110)_P$ | 0 | — | — |

After conversion, $B=(0111)_N$ is the element $\alpha^7$ represented in normal basis. The external shifting can be seen by examining the normal-basis representations in the last column of the above table.

Exemplary optimizations of the above algorithm are as follows. The step by which the coefficient B[i] is computed could be implemented in its basic form as a linear combination (e.g., a parity relation over GF(2)), though this would be beneficial only if the linear combination can be computed more efficiently than a multiplication in the internal basis. It is possible to reduce the number of iterations of the loop and potentially improve performance by processing more than one coefficient per iteration. For instance, in the case that m is even, one can change the loop to:

```
for i from 0 to m/2 − 1 downto 0 do
    T ← A × $V_{m-1}$
    B[i + m/2] ← T[0]
    T ← A × $V_{m/2-1}$
    B[i] ← T[0]
    A ← $A^q$
endfor
```

The potential improvement is a reduction in the number of exponentiations to the power q, with an increase in the number of multiplications. This approach can be generalized to process any number of coefficients at each iteration. To further reduce the number of operations, one could bring the last iteration out of the loop, ending with $T \leftarrow A \times V_{m-1}$ and $B[0] \leftarrow T[0]$. In this case the final value of the input A will differ from the initial value.

3.0 Conversion Algorithms for Different Internal and External Ground Fields

The algorithms presented so far all assumed that the ground field is the same for the internal and the external basis. This is particularly evident in import-algorithm steps such as $$A \leftarrow A + B[i] \times I$$

and in export-algorithm steps such as $$B[i] \leftarrow A[0]$$

and $$A \leftarrow A - B[i] \times V_0.$$

If the internal and external ground fields are different, such steps will be undefined in terms of internal-basis operations. To handle different ground fields, or even different representations for the same ground field, the ground-field representation should be considered in terms of the underlying finite field GP): that is, how elements of IF(q) are represented over IF(p) in the internal and external bases. Considering the ground-field representation in this manner, it is possible to convert to and from "sub coefficients" of each coefficient, where the sub coefficients are elements of GFgp). A coefficient $B[i] \in GF(q=p^r)$ is thus viewed as a sequence $B[i][0], \ldots, B[i][r-1] \in GF(p)$, where the subcoefficients are the representation of the coefficient over the ground-field basis. The algorithms presented above are readily extended to the situation in which the internal and external ground fields are different, with appropriate processing of subcoefficients. For importing, this extension is straightforward. For exporting, however, two additional observations will be utilized. Again, two cases are considered, depending on whether the ground-field basis is a polynomial basis or a normal basis.

The first observation is that if the external ground-field basis is a polynomial basis, then multiplication by the inverse $\eta^{-1}$ of the generator $\eta$ of the ground-field basis shifts the subcoefficients down, provided that the subcoefficient at index 0 is initially 0. Specifically, let B be the external representation of an element $\epsilon$, and let B' be the external representation of the element $\epsilon \eta^{-1}$. Then for all indexes i and all indexes $j<r-1$, $$B'[i][j] = B[i][j+1]$$

provided that B[i][0]=0. Note that B'[i][m−1]=0.

The second observation is that if the external ground-field basis is a normal basis, then multiplication by a certain element $\sigma$ moves the subcoefficient at index 1 to index 0. Specifically, let B be the external representation of an element $\epsilon$, let $\sigma \in GF(q)$ be the element such that the subcoefficient at index 0 of $\sigma$ is 1 for j=1 and 0 otherwise, and let B' be the external representation of the element $\epsilon\sigma$. Then for all indexes i, $$B'[i][0] = B[i][1].$$

This observation may be proven as follows. The element $\sigma$ exists, as it corresponds to the linear function that computes the subcoefficient at index 1 of an element in the ground-field basis. Since $\sigma \in GF(q)$, for all i, $B'[i] = B[i]\sigma$. Thus B'[i][0] is the subcoefficient at index 0 of the value $$\sum_{j=0}^{r-1} B[i][j]\eta^{p^j}\sigma,$$

and the result follows by the definition of $\sigma$. Two corollaries to the second observation include that the element $$\sigma^{p^{j-1}}$$

moves the subcoefficient at index to index j−1 (this follows by "rotation" of all quantities), and the element $$\sigma^{(p^j-1)/(p-1)}$$

moves the subcoefficient at index j to index 0 this follows by multiplying successive elements). It follows from the second corollary that the sequence of elements $$<\sigma^{(p^j-1)/(p-1)}>$$

is the dual basis of the ground-field normal basis $<\eta^{(p^j)}>$ with respect to the subcoefficient at index 0. The value $\sigma$ is the generator of the dual basis. The observations thus lead to a "dual-basis" approach to computing the subcoefficients for each coefficient: multiply by successive elements in the sequence $$<\sigma^{(p^j-1)/(p-1)}>,$$

each time recording the subcoefficient at index 0. In the following, S denotes the internal representation of the dual-basis generator $\sigma$ and $V_{ij}$, the value such that if $T = A \times V_{ij}$, then $T[0] = B[i][j]$.

Eight additional exemplary conversion algorithms will now be described, for importing and exporting with external polynomial and normal bases, where the external ground-field basis may be either a polynomial basis or a normal basis. Although the following exemplary algorithms represent the more efficient form of each algorithm, further optimizations are certainly possible, as are alternative forms. It is not a requirement of the algorithms in this section that the internal and external ground fields be different. Indeed, it is possible to implement only the algorithms in this section, and still support most of the conversions handled by the previously-described algorithms, albeit somewhat less efficiently. The only conversions not supported by the algorithms in this section are those in which the ground-field basis is neither polynomial nor normal.

The algorithms in this section also support the case in which the internal and external bases are the same and the ground-field bases are different. A more efficient approach to that case, however, would be to convert the coefficients one by one, following techniques similar to those above but operating over the ground field bases. The dual-basis approach described above can also be applied to produce the following alternative to the previously-described algorithm EXPORTNORMAL, where S denotes the internal representation of the dual-basis generator.

```
proc EXPORTNORMAL*
    A ← A × V_o
    W ← S
    for i from 0 to m − 1 do
        B[i] ← A[0]
        A ← A × W
        W ← W^q
    endfor
endproc
```

The variant involves m exponentiations to the power q and m+1 multiplications, and requires storage for two constants and one intermediate result, W. Its main disadvantage relative to the EXPORTNORMAL algorithm is the increased storage requirement.

3.1 Importing from a Polynomial Basis with Polynomial-Basis Coefficients

The algorithm IMPORTPOLY2 converts from a polynomial-basis representation with polynomial-basis coefficients to an internal representation, primarily with internal-basis operations.

```
Input:        B[0][0], ... ,B[m-1][r-1], the external representation
to be converted
Output:       A, the corresponding internal representation
Parameters:   m, the degree of the finite field (over the ground field);
r, the degree of the ground field (over GF(p))
Constants:    G, the internal representation of the generator of the
external basis H, the internal representation of the generator of the
external ground-field basis
Algorithm:    proc IMPORTPOLY2
                  A ← 0
                  for i from m-1 downto 0 do
                      A ← A × G
                      T ← 0
                      for j from r-1 downto 0 do
                          T ← T × H
                          T ← T + B[i][j] × I
                      endfor
                      A ← A + T
                  endfor
              endproc
```

The algorithm follows IMPORTPOLY in both its loops. It involves mr+m multiplications, m additions, and mr scalar additions, and requires storage for two constants and one intermediate result, T. Potential optimizations are similar to those for IMPORTPOLY. More particularly, it is possible to reduce the number of iterations of either loop by processing more than one subcoefficient at a time in the inner loop.

3.2 Importing from a Polynomial Basis with Normal-Basis Coefficients

The algorithm IMPORTPOLYNORMAL converts from a polynomial-basis representation with normal-basis coefficients to an internal representation, primarily with internal-basis operations.

```
Input:        B[0][0], ... ,B[m-1][r-1], the external representation
to be converted
Output:       A, the corresponding internal representation
Parameters:   m, the degree of the finite field (over the ground field);
r, the degree of the ground field (over GF(p)); p, the
characteristic of the field
Constants:    G, the internal representation of the generator of the
external basis; H, the internal representation of the generator of the
external ground-field basis
Algorithm:    proc IMPORTPOLYNORMAL
                  A ← 0
                  W ← H
                  for j from 0 to r-1 do
                      T ← 0
                      for i from m-1 downto 0 do
                          T ← T × G
                          T ← T + B[i][j] × I
                      endfor
                      A ← A + T × W
                      W ← W^p
                  endfor
              endproc
```

The algorithm follows a variant of IMPORTNORMAL in its outer loop and IMPORTPOLY in its inner loop. It processes the ground-field basis in the outer loop rather than the inner loop to reduce the number of exponentiations. However, this also requires the variant approach in the outer loop, since the loop from IMPORTNORMAL is only effective when the "coefficients" processed by the loop are in the ground field, due to the exponentiations to the power p. Here, these coefficients are in the fall field. The algorithm involves r exponentiations to the power p, mr+r multiplications, r additions, and mr scalar additions, and requires storage for two constants and two intermediate results, T and W. in addition to the intermediate results for exponentiation. Note that the final value of W is the same as its initial value, H.

Potential optimizations are similar to those for IMPORT-POLY. More particularly, it is possible to reduce the number of iterations of the inner loop by processing more than one subcoefficient at a time in the inner loop. However, it may not be possible to reduce the number of iterations of the outer loop, given that the relationship between subcoefficients changes from one iteration to the next.

3.3 Importing from a Normal Basis with Polynomial-Basis Coefficients

The algorithm IMPORTNORMALPOLY converts from a normal-basis representation with polynomial-basis coefficients to an internal representation, primarily with internal-basis operations.

```
Input:        B[0][0], ... ,B[m-1][r-1], the external
representation to be converted
Output:       A, the corresponding internal representation
Parameters:   m, the degree of the finite field (over
the ground field); q, the order of the ground field; r, the degree of
the ground field (over GF(p))
Constants:    G, the internal representation of the
generator of the external basis; H, the internal representation of the
generator of the external ground-field basis
Algorithm:    proc IMPORTNORMALPOLY
                  A ← 0
                  for i from m-1 downto 0 do
                      T ← 0
                      A ← A^q
                      for j from r-1 downto 0 do
                          T ← T × H
                          T ← T + B[i][j] × I
                      endfor
                      A ← A + T × G
                  endfor
              endproc
```

The algorithm follows IMPORTNORMAL in its outer loop and IMPORTPOLY in its inner loop. It involves m exponentiations to the power q, mr +r multiplications, m additions, and mr scalar additions, and requires storage for two constants and one intermediate result, T. in addition to the intermediate results for exponentiation.

Potential optimizations are similar to those for IMPORT-POLY and IMPORTNORMAL. More particularly, it is possible to reduce the number of iterations of either loop by processing more than one subcoefficient at a time in the inner loop.

3.4 Importing from a Normal Basis with Normal-Basis Coefficients

The algorithm IMPORTNORMAL2 converts from a normal-basis representation with normalbasis coefficients to an internal representation, primarily with internal-basis operations.

```
Input:          B[0][0], . . . ,B[m-1][r-1], the external
representation to be converted
    Output:     A, the corresponding internal representation
    Parameters: m, the degree of the finite field (over
the ground field); r, the degree of the ground field (over GF(p)); p, the
characteristic of the field
    Constants:  G, the internal representation of the
generator of the external basis; H, the internal representation of
the generator of the external ground-field basis
    Algorithm:           proc IMPORTNORMAL2
                             A ← 0
                             for i from m-1 downto 0 do
                                 T ← 0
                                 A ← A^q
                                 for j from r-1 downto 0 do
                                     T ← T × T^p
                                     T ← T + B[i][j] × H
                                 endfor
                                 A ← A + T × G
                             endfor
                         endproc
```

The algorithm follows IMPORTNORMAL in both its loops. It involves m exponentiations to the power q, mr exponentiations to the power p, m multiplications, m additions, and mr scalar multiply-and-adds, and requires storage for two constants and one intermediate result, T. in addition to the intermediate results for exponentiation.

Potential optimizations are similar to those for IMPORTNORMAL. More particularly, it is possible to reduce the number of iterations of the inner loop by processing more than one subcoefficient at a time in the inner loop. However, it may not be possible to reduce the number of iterations of the outer loop, due to the exponentiation to the power p in the inner loop.

3.5 Exporting to a Polynomial Basis with Polynomial-Basis Coefficients

The algorithm EXPORTPOLY2 converts from an internal representation to a polynomial-basis representation with polynomial-basis coefficients, primarily with internal-basis operations.

```
Input:          A, the internal representation to be converted
    Output:     B[0][0], . . . ,B[m-1][r-1], the corresponding
external representation
    Parameters: m, the degree of the finite field (over
the ground field); r, the degree of the ground field (over GF(p))
    Constants:  H^{-1}, the internal representation of
the inverse of the generator of the
external ground-field basis; G^{-1}H^r, the product of ^{-1}, the internal
representation of the generator of the inverse of the
generator of the external basis, and H^r, the internal
representation of the rth power of the generator
of the external ground-field basis; and V_{0,0}, the
value such that if T = A × V_{0,0}, then
T[0] = B[0][0]
    Algorithm:           proc EXPORTPOLY2
                             A ← A × V_{0,0}
                             for i from 0 to m-1 do
                                 for j from 0 to r-1 do
                                     B[i][j] ← A[0][0]
                                     A ← A - B[i][j] × V_{0,0}
                                     A ← A × H^{-1}
                                 endfor
                                 A ← A × G^{-1}H^r
                             endfor
                         endproc
```

The algorithm generally follows EXPORTPOLY in both its loops, the main difference being the multiplication by $G^{-1}H^r$ after the inner loop. The correction process is for both loops.

The algorithm involves mr+m+1 multiplications and mr scalar multiply-and-subtracts, and requires storage for three constants and one intermediate result, T. The input A is modified by the algorithm. Potential optimizations are similar to those for EXPORTPOLY. However, since the correction process is for both loops, a correction step is necessary for each subcoefficient, thus limiting the benefits of processing more than one subcoefficient at a time in the inner loop.

3.6 Exporting to a Polynomial Basis with Normal-Basis Coefficients

The algorithm EXPORTPOLYNORMAL converts from an internal representation to a polynomial-basis representation with normal-basis coefficients, primarily with internal-basis operations.

```
Input:          A, the internal representation to be converted
    Output:     B[0], . . . ,B[m-1], the corresponding external
representation
    Parameters: m, the degree of the finite field (over
the ground field); r, the degree of the ground field (over GF(p)); p, the
characteristic of the field
    Constants:  S, the internal representation of the
generator of the dual basis of the external
ground-field basis; G^{-1}, the
internal representation of the inverse of the generator of the
external basis; H, the internal representation of the generator of the
external ground-field basis; V_{0,0},
the value such that if T = A × V_{0,0}, then T[0] = B[0][0]
    Algorithm:           proc EXPORTPOLYNORMAL
                             A ← A × V_{0,0}
                             for i from m-1 downto 0 do
                                 T ← A
                                 W ← S
                                 for j from 0 to r-1 do
                                     B[i][j] ← T[0][0]
                                     T ← T × W
                                     W ← W^p
                                 endfor
                                 T ← 0
                                 W ← H
                                 for j from 0 to r-1 do
                                     T ← T + B[i][j] × W
                                     W ← W^p
                                 endfor
                                 A ← A - T × V_{0,0}
                                 A ← A × G^{-1}
                             endfor
                         endproc
```

The algorithm follows EXPORTPOLY and the dual-basis approach described above in its outer loop. The correction process is for the outer loop only, and is conducted in the second inner loop. The two inner loops could be merged in alternative embodiments. The algorithm involves 2mr exponentiations to the power p, mr+2m+1 multiplications, mr scalar multiply-and-adds, and m subtractions, and requires storage for four constants and two intermediate results, T and W, in addition to the intermediate results for exponentiation. The input A is modified by the algorithm.

Potential optimizations are similar to those for EXPORTPOLY. More particularly, it is possible to reduce the number of iterations of the outer loop by processing more than one subcoefficient at a time in the first inner loop. The correction process in the second inner loop would generally not change. It may not be possible to reduce the number of iterations of the first inner loop, given that the relationship between subcoefficients changes from one iteration to the next.

3.7 Exporting to a Normal Basis with Polynomial-Basis Coefficients

The algorithm EXPORTNORMALPOLY converts from an internal representation to a normal basis representation with polynomial-basis coefficients, primarily with internal-basis operations.

| Input: | A, the internal representation to be converted |
|---|---|
| Output: | $B[0], \ldots, B[m-1]$, the corresponding external representation |
| Parameters: | m, the degree of the finite field (over the ground field); q, the order of the finite field; r, the degree of the ground field (over GF(p)) |
| Constants: | $H^{-1}$, the internal representation of the inverse of the generator of the external ground-field basis; $V_{m-1,0}$, the value such that if $T = A \times V_{m-1,0}$, then $T[0] = B[m-1][0]$; $V_{m-1,0}G$, the product of the value $V_{m-1,0}$ and G, the internal representation of the generator of the external basis |
| Algorithm: | proc EXPORTNORMALPOLY<br>  for i from m−1 downto 0 do<br>    $T \leftarrow A \times V_{m-1,0}$<br>    for j from 0 to r−1 do<br>      $B[i][j] \leftarrow T[0][0]$<br>      $T \leftarrow T - B[i][j] \times V_{m-1,0}G$<br>      $T \leftarrow T \times H^{-1}$<br>    endfor<br>    $A \leftarrow A^q$<br>  endfor<br>endproc |

The algorithm follows EXPORTNORMAL in its outer loop and EXPORTPOLY in its inner loop. The correction process is for the inner loop only. Note the factor of G in the correction step, required by the fact that the external basis is a normal basis. The algorithm involves m exponentiations to the power q, mr+m multiplications, and mr scalar multiply-and-subtracts, and requires storage for three constants and one intermediate result, T, in addition to the intermediate results for exponentiation. The input A, though modified by the algorithm, returns to its initial value.

Potential optimizations are similar to those for EXPORTPOLY and EXPORTNORMAL. More particularly, it is possible to reduce the number of iterations of either loop by processing more than one subcoefficient at a time in the inner loop.

3.8 Exporting to a Normal Basis with Normal-Basis Coefficients

The algorithm EXPORTNORMAL2 converts from an internal representation to a normal-basis representation with normal-basis coefficients, primarily with internal-basis operations.

| Input: | A, the internal representation to be converted |
|---|---|
| Output: | $B[0], \ldots, B[m-1]$, the corresponding external representation |
| Parameters: | m, the degree of the finite field (over the ground field); q, the order of the finite field; r, the degree of the ground field (over GF(p)); p, the characteristic of the field |
| Constants: | S, the internal representation of the generator of the dual basis of the external ground-field basis; $V_{m-1,0}$, the value such that if $T = A \times V_{m-1,0}$, then $T[0] = B[m-1][0]$ |
| Algorithm: | proc EXPORTNORMAL2<br>  for i from m−1 downto 0 do<br>    $T \leftarrow A \times V_{m-1,0}$<br>    $W \leftarrow S$<br>    for j from 0 to r−1 do<br>      $B[i][j] \leftarrow T[0][0]$<br>      $T \leftarrow T \times W$<br>      $W \leftarrow W^p$<br>    endfor<br>    $A \leftarrow A^q$<br>  endfor<br>endproc |

The algorithm follows EXPORTNORMAL in its outer loop and the dual-basis approach previously described in its inner loop. As with the EXPORTNORMALPOLY algorithm, the dual-basis approach is required, since the loop from EXPORTNORMAL is only effective when the "coefficients" processed by the loop are in the ground field, due to the exponentiations to the power p. A correction process is generally not required. The algorithm involves m exponentiations to the power q, mr exponentiations to the power p, and mr+m multiplications, and requires storage for two constants and two intermediate results, T and W, in addition to the intermediate results for exponentiation. The input A, though modified by the algorithm, returns to its initial value.

Potential optimizations are similar to those for EXPORTNORMAL. More particularly, it is possible to reduce the number of iterations of the outer loop by processing more than one subcoefficient at a time in the inner loop. However, it may not be possible to reduce the number of iterations of the inner loop, given that the relationship between subcoefficients changes from one iteration to the next.

4.0 Dual-Basis Conversions

Conversion to and from an external dual basis will now be described. Detailed algorithms for conversion from an external dual basis will not be provided, since such algorithms can be easily constructed and optimized by one of ordinary skill in the art using the general approach of the conversion algorithms described in the previous sections. The following description will consider an illustrative case in which the internal and external bases are defined over the same ground field, although the above techniques may be readily applied to accommodate a change of ground field. The algorithms provided above can thus be extended to the case in which the ground-field basis is a dual basis. In contrast to the algorithms in the previous sections, the export algorithms for an external dual basis are the direct ones in this case, and the import algorithms are based on additional observations.

4.1 Exporting to a Dual Basis

For exporting to the dual basis of a polynomial or normal basis, first recall that one way to convert to a basis $\omega_0, \ldots, \omega_{m-1}$ is to compute values of the form $$B[i] = h(\in \xi_i)$$

where h is a linear function and $\xi_0, \ldots, \xi_{m-1}$ is the dual basis of the basis $\omega_0, \ldots, \omega_{m-1}$ with respect to h. In general, the difficulty with this approach is in generating the dual basis. However, if the basis $\omega_0, \ldots, \omega_{m-1}$ is the dual basis of a polynomial or normal basis, then the difficulty is removed, as the basis $\xi_0, \ldots, \omega_{m-1}$ is polynomial or normal and therefore is easily generated. This leads to the following general algorithm for exporting to a dual basis of either a polynomial or normal basis: multiply in the internal basis by successive elements of the polynomial or normal basis, and evaluate the function h, for example, by another multiplication. Premultiplication may be helpful here, as described above in conjunction with the EXPORTPOLY algorithm.

4.2 Importing from the Dual Basis of a Polynomial Basis

For importing from the dual basis of a polynomial basis, the following assumptions will be made. Let $\omega_0, \ldots, \omega_{m-1}$ be the dual basis of a polynomial basis $(\gamma^i)$ with respect to some linear function h, and let $h_0$ be the function that computes the coefficient at index 0 of the polynomial-basis representation of an element. Then for all i, $$\omega_i = \zeta^{-1} \xi_i$$

where $$\xi_i = \xi_{i-1}\gamma^{-1} - h_0(\xi_{i-1}\gamma^{-1})$$

for i>0, $\xi_0=1$, and $\xi$ is the element such that $h_0(\in)=h(\in\zeta)$. The element $\zeta$ exists, following a generalization of observations described previously. Since the dual basis is uniquely defined, it need only be shown that the dual basis as defined satisfies $$h(\omega_i \gamma^j) = \begin{cases} 1 \text{ if } i = j; \\ 0 \text{ otherwise.} \end{cases}$$

By definition of $\zeta$ and $\omega_i$, it can alternatively be shown that $$h_0(\xi_i \gamma^j) = \begin{cases} 1 \text{ if } i = j; \\ 0 \text{ otherwise.} \end{cases}$$

This can be shown by induction on i. For i=0, the property holds since $\xi_0=1$. For i>0 and j=0, $$h_0(\xi_i\gamma^0) = h_0(\xi_{i-1}\gamma^{-1} - h_0(\xi_{i-1}\gamma^{-1})) = 0.$$

For i>0 and j>0, $$h_0(\xi_i\gamma^j) = h_0(\xi_{i-1}\gamma^{j-1} - h_0(\xi_{i-1}\gamma^{-1})\gamma^j) = h_0(\xi_{i-1}\gamma^{j-1}).$$

By induction, $h_0(\xi_{i-1}\gamma^{j-1})$ is 1 if i=j and 0 otherwise. The property thus holds for each i>0, and the result follows. The dual basis is thus generated by two elements, $\zeta$ and $\gamma$, where the first depends on the function h and the polynomial-basis generator $\gamma$, and the second is the generator of the polynomial basis.

A general algorithm for importing from a dual basis of a polynomial basis may therefore be as follows: generate the internal representation of the elements of the basis from the internal representations of the two elements $\zeta$ and $\gamma$, and add scalar multiples of the basis elements according to the coefficients of the external representation. The evaluation of the function $h_0$ in the process of generating the dual basis can be done by multiplication, or the evaluations can be precomputed and stored as constants. In the former case, premultiplication may be helpful, particularly if $\zeta=1$. In the case that the internal basis is the polynomial basis, evaluating the function $h_0$ is generally trivial, and the generation of the dual basis may consist only of a simple shifting operation.

4.3 Importing from the Dual Basis of a Normal Basis

For importing from a dual basis of a normal basis, the following assumptions will be made. Let $\omega_0, \ldots, \omega_{m-1}$ be the dual basis of a normal basis ($\gamma^{q^i}$) with respect to some linear function h, and let $h_0$ be the function that computes the coefficient at index 0 of the normal-basis representation of an element. Then for all i, $$\omega_i = \zeta^{-1}$$

where $\zeta$ is the element such $h_0(\in)=h(\in\zeta)$, and $\sigma$ is the element such that $h_0(\sigma)$ is 1 for j=1 and 0 otherwise. Both elements exist, and it is sufficient to show that $$h_0(\omega_i\gamma^j) = \begin{cases} 1 \text{ if } i = j; \\ 0 \text{ otherwise.} \end{cases}$$

This follows from applying observations given above to the normal basis rather than to the ground-field basis. The dual basis is thus generated by two elements, $\zeta$ and $\sigma$, where the first depends on the function h and the normal-basis generator $\gamma$, and the second depends only on the normal basis. As an example, the dual basis mentioned above has $\zeta=1$.

An algorithm for importing from a dual basis of a normal basis may therefore be summarized as follows: generate the internal representation of the elements of the basis from the internal representations of the two elements $\zeta$ and $\sigma$, and add scalar multiples of the basis elements according to the coefficients of the external representation.

5.0 Correspondence Between Figures and Conversion Algorithms

Sections 2, 3 and 4 above described exemplary basis conversion algorithms in accordance with the present invention. The exemplary algorithms can be implemented using one or more of the embodiments of the invention illustrated in FIGS. 1 through 11B. A general correspondence between certain of the algorithms and certain of the Figures will be given below. It should be noted that not all of the Figures are suitable for use with a particular illustrative algorithm. For example, the externally shifted sequence generator 14 of FIG. 11A is not utilized by any of the illustrative algorithms of Sections 2, 3 or 4, although it could of course be utilized with other basis conversion algorithms in accordance with the invention.

There are generally a variety of techniques for exporting to each type of basis of interest. The present invention may utilize a number of techniques for which external shifting is performed in an "outer loop" of the conversion algorithm. These techniques may also include multiplication by extraction factors in an "inner loop" of the conversion algorithm. The techniques designated "dual" are techniques in which multiplication by extraction factors is performed in an "inner loop" of the conversion algorithm. In the following table, the term "direct" indicates that the ground fields are the same, so the coefficients may be processed directly, while the terms "poly" and "normal" refer to the external ground-field representation in the case that the ground fields are different. The term "premult" indicates that a premultiplication step is involved in the conversion, so that the actual shift/extract conversion takes place in a scaled basis. Although premultiplication is in general the preferred way to perform scaled basis conversion, because it simplifies the extraction step, it is also possible to do the conversion without premultiplication. In addition, it should be noted that premultiplication can sometimes be done as part of extraction, prior to other operations during the extraction step. Also, forms of rotation and shifting other than those shown in the following table may also be utilized in the basis conversion techniques of the present invention. Furthermore, the FIG. 7B extractor embodiment is generally an acceptable alternative to the FIG. 7D embodiment, the FIG. 7C embodiment is generally an acceptable alternative to the FIG. 7D embodiment when the coefficients are in GF(2), and the FIG. 7E embodiment may be substituted for that of FIG. 7D in certain cases. The illustrative techniques in Sections 2, 3 and 4 may include further optimizations beyond the combinations of techniques described here. It should be emphasized that the combinations listed are only examples, and numerous other combinations could be used.

| Basis | Coefficients | Technique | Figure(s) | Algorithm |
|---|---|---|---|---|
| poly | direct | shift right | 11A, 7D | |
| | | premult / shift right | 6, 11B, 7A | EXPORTPOLY |
| | poly | shift right / shift right | 11A, 8A | |
| | | premult / shift right / shift right | 6, 11B, 8A | EXPORTPOLY2 |
| | | shift right / premult / shift right | 11A, 8B | |
| | | shift right / dual | 11A, 8C | |
| | | premult / shift right / dual | 6, 11B, 8C | |
| | normal | shift right / dual | 11A, 8C | |
| | | premult / shift right / dual | 6, 11B, 8C | EXPORTPOLYNORMAL |
| normal | direct | rotate right | 9, 7D | EXPORTNORMAL |
| | poly | rotate right / shift right | 9, 8A | |
| | | rotate right / premult / shift right | 9, 8B | EXPORTNORMALPOLY |
| | | rotate right / dual | 9, 8C | |
| | normal | rotate right / dual | 9, 8C | EXPORTNORMAL2 |

It should be noted that in many of the basis conversion algorithms presented herein, the optimized FIG. 2B form may apply, as well as the FIG. 5 form. The FIG. 2A form is generally best suited for an external normal-basis representation.

6.0 Applications

Many public-key cryptosystems are based on operations in large finite mathematical groups, and the security of these cryptosystems relies on the computational intractability of computing discrete logarithms in the underlying groups. Two major classes of such cryptosystems are conventional discrete logarithm cryptosystems and elliptic curve cryptosystems. For both classes, the group operations usually consist of arithmetic in finite fields, in particular GF(p) and $GF(2^m)$. In this section, the description focuses on the application of the above-described conversion algorithms to elliptic curve cryptosystems over $GF(2^m)$. First, a brief overview is provided to illustrate how elliptic curve operations are defined based on arithmetic over $GF(2^m)$ and how elliptic curve cryptosystems are defined based on elliptic curve operations. Then, the efficiency of the conversion algorithms presented above is analyzed for the special case of converting between polynomial and normal bases over $GF(2^m)$ and it is shown that the conversion algorithms incur a very small computational cost in elliptic curve cryptosystems. Although the following description is focused on elliptic curve systems, the general principles extend to other applications, such as discrete logarithm systems over $GF(2^m)$.

6.1 Elliptic Curves over $GF(2^m)$ and Elliptic Curve Operations

A non-supersingular elliptic curve over $GF(2^m)$ defined by parameters a and b is the set of points (x, y) on the curve $$y^2 + xy = x^3 + ax^2 + b$$

together with an extra point O, the point at infinity, where a, b, x, y $\in GF(2^m)$ and b$\neq$0. The set of points is a group with respect to certain rules for adding two points. In general, such an addition may be accomplished by a series of field operations in $GF(2^m)$. The number of squarings, multiplications and divisions involved is summarized in the following table for both affine and projective coordinates. Squaring is distinguished from general multiplication since the former may be implemented much faster than the latter. In particular, with a normal basis representation, squaring can be done by a simple external shift operation. The number of operations generally depends on the particular formulas and constraints on the parameters. The number given here is based on the IEEE P1363 appendix on number-theoretic algorithms, and for addition, it is assumed that a=0. For further details, see the editorial contribution to IEEE Standard for Public-Key Cryptography on <http://stdsbbs.ieee.org/groups/1363/index.html>, or A. Menezes, "Elliptic Curve Public Key Cryptosystems," Kluwer Academic Publishers, 1993, both of which are incorporated by reference herein.

| | Adding Two Distinct Points | Doubling a Point |
|---|---|---|
| Affine coordinates | 1 squaring<br>1 multiplication<br>1 division | 2 squarings<br>1 multiplication<br>1 division |
| Projective coordinates | 3 squarings<br>10 multiplications | 5 squarings<br>5 multiplications |

In general, field division is much more expensive than multiplication and squaring, although it can be quite fast in software with special optimization. For the rest of the description, it is assumed that projective coordinates are used in elliptic curve operations. An elliptic curve operation over $GF(2^m)$, sometimes called a scalar multiplication on the elliptic curve, consists of repeated additions on the elliptic curve. The scalar multiplication may be written as Q=kP, where P and Q are points on the elliptic curve and k, the multiplier, is an integer. In practice, the multiplier k is about m bits long. A straightforward implementation of one elliptic curve operation requires about m/2 additions of distinct points and m doublings of points. There are many techniques for reducing the number of additions and doublings, possibly using precomputation, as there are for optimizing the conversion algorithms. For the purposes of this section, only the basic forms of the various techniques will be considered.

6.2 Elliptic Curve Cryptosystems

Elliptic curve cryptosystems that are of particular interest today are analogs of conventional discrete logarithm cryptosystems in which exponentiation operations are replaced with elliptic-curve operations. Let ECDH, ECDSA, and ECES denote the elliptic-curve analogs of Diffie-Hellman key agreement, DSA, and the E1 Gamal encryption algorithm, respectively. The number of elliptic curve operations involved in each of these elliptic curve techniques is summarized in the following table. See the above-cited IEEE P1363 reference for more exact definitions of these techniques.

| Technique | | EC Operations |
|---|---|---|
| ECDH | phase 1 | 1 |
|  | phase 2 | 1 |
| ECDSA | signature | 1 |
|  | verification | 2 |
| ECES | encryption | 2 |
|  | decryption | 1 |

Based on the observations above, it can be seen that, for example, the signature operation of ECDSA implemented in projective representation over $GF(2^m)$ involves about $(3\times m/2+5\times m)=6.5m$ squarings and $(10\times m/2+5\times m)=10m$ multiplications.

6.3 Conversion Algorithms between Polynomial and Normal Bases over $GF(2^m)$ Several general basis conversion algorithms were described above. When the finite field is $GF(2^m)$, those algorithms can be simplified and made more efficient, as described in the notes to those algorithms. For the purposes of illustration, the following will focus on the exemplary algorithms IMPORTPOLY, IMPORTNORMAL, EXPORTPOLY and EXPORTNORMAL as optimized for the finite field $GF(2^m)$ with coefficients in $GF(2)$. Only the optimizations related to the case in which the coefficients are in $GF(2)$ will be considered, and further optimizations, such as processing more than one coefficient at a time, will not be considered here. The number of field operations and the memory requirement for each conversion algorithm are summarized in the following table. Additions are ignored, as such operations are relatively fast. The number of field elements stored includes both constants, denoted c, and intermediate results, denoted i, following the analysis given for the algorithms.

| Conversion Algorithm | Multiplications | Squarings | Field Elements Stored |
|---|---|---|---|
| IMPORTPOLY | m | 0 | 1c |
| IMPORTNORMAL | 0 | m | 1c |
| EXPORTPOLY | m+1 | 0 | 2c |
| EXPORTNORMAL | m | m | 1c + 1i |

6.4 Cost of Basis Conversion in Elliptic Curve Cryptosystems

In order to analyze the cost of conversion in an elliptic curve cryptosystem, a general situation will be considered in which two parties A and B implement some elliptic curve technique over $GF(2^m)$ with different choices of basis (e.g., A has a polynomial basis and B a normal basis).

In such a situation, each elliptic curve operation (Q=kP) in the scheme would require at most two conversions by one of the parties, one before and one after the operation. For example, in phase 2 of ECDH, party A would convert the public value P (received from B) from normal basis to polynomial basis, compute Q=kP in that basis, and convert Q from polynomial basis back to normal basis. Alternatively, party B would perform the conversions. Of course, the situation may vary according to the actual implementation. Based on the above discussions, the cost of two conversions (back and forth) will be compared with the cost of one elliptic curve operation.

| Operation | Multiplications | Squarings |
|---|---|---|
| IMPORTPOLY+ EXPORTPOLY | 2m+1 | 0 |
| IMPORTNORMAL+ EXPORTNORMAL | m | 2m |
| EC operation | 10m | 6.5m |

When the external basis is a polynomial basis, the pair of conversions involves 2m+1 multiplications. The extra cost of conversion compared with one elliptic curve operation is about $2/(10+6.5)=12\%$ for an internal polynomial basis (assuming multiplications and squarings cost the same) and about $2/10=20\%$ for an internal normal basis (since squarings are essentially free in an internal normal basis). When the external basis is a normal basis, the pair of conversions involves m multiplications and 2m squarings, so the extra cost is about $(1+2)/(10+6.5)=18\%$ for an internal polynomial basis and about $1/10=10\%$ for an internal normal basis. Overall, the conversion algorithms incur only a small extra cost in an elliptic curve cryptosystem, and the memory requirement is quite reasonable: only one or two elements need to be stored. Indeed, the overhead is comparable to an exponentiation over $GF(2^m)$, so the cost of conversion may be reasonable even in a conventional discrete logarithm cryptosystem. The cost can be reduced still further by additional optimizations such as processing more than one coefficient at a time, with the only additional requirement being the storage of a small number of additional elements.

The techniques described above are exemplary and should not be construed as limiting the present invention to any particular embodiment or group of embodiments. The basis conversion techniques of the present invention are suitable for use in a wide variety of applications, including cryptography, encoding and other signal processing applications. Numerous alternative embodiments within the scope of the appended claims will be readily apparent to those of ordinary skill in the art.

What is claimed is:

1. A method of generating in a digital data processor, from a value A representing in a first basis an element of a finite field $GF(q^m)$, at least part of a value B representing said element in a second basis, wherein q is a prime number or power of a prime number and m is an integer greater than or equal to 2, and wherein said value B includes a vector of m coefficients from a finite field $GF(q)$, the method comprising the steps of:

generating from said value A in an externally shifted sequence generator a sequence of intermediate values representing in said first basis elements of the finite field $GF(q^m)$ whose representations in said second basis are related to said value B by at least one predetermined external shift operation; and generating from said sequence of intermediate values in an extractor at least a subset of the coefficients of said value B.

2. The method of claim 1 wherein the step of generating from said value A a sequence of intermediate values includes sequentially applying a predetermined logic function to said value A, such that after a number of steps, each of said intermediate values has been generated.

3. The method of claim 2 wherein said number of steps is m−1.

4. The method of claim 2 wherein said number of steps is approximately $\lfloor (m-1)/k \rfloor$, where k is an integer greater than or equal to 2.

5. The method of claim 1 wherein said second basis is a normal basis and said predetermined external shift operation is a rotation operation that rotates in the direction of increasing powers of a generator of the normal basis.

6. The method of claim 1 wherein said second basis is a polynomial basis and said predetermined external shift operation is a shift operation that shifts in the direction of decreasing powers of a generator of the polynomial basis.

7. The method of claim 1 wherein the step of generating the sequence of intermediate values further includes feeding back at least one of the intermediate values to a register previously storing the value A.

8. The method of claim 1 further including the step of feeding back at least one of the coefficients of said value B to an input of the externally shifted sequence generator performing the generating step.

9. The method of claim 1 further including the step of premultiplying the value A by a scaling factor, such that the step of generating the sequence of intermediate values and the step of generating the coefficients may be performed in a scaled basis.

10. The method of claim 1 wherein the step of generating the coefficients includes applying the sequence of intermediate values to a coefficient selector which processes the intermediate values to generate the coefficients of said value B.

11. The method of claim 10 wherein the step of generating the coefficients includes multiplying the sequence of intermediate values by at least one extraction factor prior to applying the sequence of intermediate values to the coefficient selector.

12. The method of claim 1 wherein the step of generating the coefficients includes generating a coefficient of said value B as a dot product of coefficients of an intermediate value and a corresponding set of values $\{s_i\}$.

13. The method of claim 1 wherein the step of generating the coefficients includes generating a coefficient of said value B as an exclusive-or of selected coefficients of an intermediate value.

14. The method of claim 1 wherein the step of generating the coefficients includes applying an additional predetermined external shift operation to the sequence of intermediate values prior to computing the coefficients of said value B, wherein the additional predetermined external shift operation shifts subcoefficients in one or more coefficients of the intermediate value.

15. The method of claim 1 wherein the step of generating the sequence of intermediate values includes applying the value A to an exponentiator to generate the sequence of intermediate values in the form of a sequence of successive exponentiations of the value A.

16. The method of claim 1 wherein the step of generating the sequence of intermediate values includes applying the value A to a scalar subtractor, and multiplying the result by $G^{-1}$, where $G^{-1}$ is an internal basis representation of an inverse of a generator for the external basis over $GF(q^m)$, to perform a computation $A \leftarrow (A-tI)G^{-1}$, where t is one of said coefficients of said value B.

17. The method of claim 1 wherein the step of generating the sequence of intermediate values includes applying the value A to a scalar multiplier/subtractor having an input scaling factor V, and multiplying the result by $G^{-1}$, where $G^{-1}$ is an internal basis representation of an inverse of a generator for the external basis over $GF(q^m)$, to perform a computation $A \leftarrow (A-tV)G^{-1}$, where t is one of said coefficients of said value B.

18. An apparatus for generating, from a value A representing in a first basis an element of a finite field $GF(q^m)$, at least part of a value B representing said element in a second basis, wherein q is a prime number or power of a prime number and m is an integer greater than or equal to 2, and wherein said value B includes a vector of m coefficients from a finite field $GF(q)$, the apparatus comprising:

an externally shifted sequence generator for generating from said value A a sequence of intermediate values representing in said first basis elements of the finite field $GF(q^m)$ whose representations in said second basis are related to said value B by at least one predetermined external shift operation; and an extractor coupled to the externally shifted sequence generator and operative to generate at least a subset of the coefficients of said value B from said sequence of intermediate values.

19. The apparatus of claim 18 wherein the externally shifted sequence generator sequentially applies a predetermined logic function to said value A, such that after a number of steps, each of said intermediate values has been computed.

20. The apparatus of claim 19 wherein said number of steps is m−1.

21. The apparatus of claim 19 wherein said number of steps is approximately $\lfloor (m-1)/k \rfloor$, where k is an integer greater than or equal to 2.

22. The apparatus of claim 18 wherein said second basis is a normal basis and said predetermined external shift operation is a rotation operation that rotates in the direction of increasing powers of a generator of the normal basis.

23. The apparatus of claim 18 wherein said second basis is a polynomial basis and said predetermined external shift operation is a shift operation that shifts in the direction of decreasing powers of a generator of the polynomial basis.

24. The apparatus of claim 18 further including a feedback path within the externally shifted sequence generator for feeding back at least one of the intermediate values to a register previously storing the value A.

25. The apparatus of claim 18 further including a feedback path between at least one output of the extractor and an input of the externally shifted sequence generator.

26. The apparatus of claim 18 further including a premultiplier for multiplying the value A by a scaling factor before the sequence of intermediate values are generated therefrom.

27. The apparatus of claim 18 wherein the extractor includes a coefficient selector which receives the sequence of intermediate values and processes the intermediate values to generate the coefficients of said value B.

28. The apparatus of claim 27 wherein the extractor further includes a multiplier for multiplying the sequence of intermediate values by at least one extraction factor before applying the sequence of intermediate values to the coefficient selector.

29. The apparatus of claim 18 wherein the extractor is operative to generate a coefficient of said value B as a dot product of coefficients of an intermediate value and a corresponding set of values $\{s_i\}$.

30. The apparatus of claim 18 wherein the extractor is operative to generate a coefficient of said value B as an exclusive-or of selected coefficients of an intermediate value.

31. The apparatus of claim 18 wherein the extractor is operative to apply an additional predetermined external shift operation to the sequence of intermediate values prior to generating the coefficients of said value B, wherein the additional predetermined external shift operation shifts sub-coefficients in one or more coefficients of the intermediate value.

32. The apparatus of claim 18 wherein the externally shifted sequence generator includes an exponentiator arranged in a feedback loop with an input register, such that the sequence of intermediate values is generated in the form of a sequence of successive exponentiations of said value A.

33. The apparatus of claim 18 wherein the externally shifted sequence generator is operative to apply the value A to a scalar subtractor, and to multiply the result by $G^{-1}$, where $G^{-1}$ is an internal basis representation of an inverse of a generator for the external basis over $GF(q^m)$, so as to perform the computation $A \leftarrow (A-tI)G^{-1}$, where t is one of said coefficients of said value B.

34. The apparatus of claim 18 wherein the externally shifted sequence generator is operative to apply the value A to a scalar multiplier/subtractor having an input scaling factor V, and to multiply the result by $G^{-1}$, where $G^{-1}$ is an internal basis representation of an inverse of a generator for the external basis over $GF(q^m)$, so as to perform the computation $A \leftarrow (A-tV)G^{-1}$, where t is one of said coefficients of said value B.

* * * * *